US009477969B2

(12) United States Patent
Boerries et al.

(10) Patent No.: US 9,477,969 B2
(45) Date of Patent: Oct. 25, 2016

(54) AUTOMATIC FEED CREATION FOR NON-FEED ENABLED INFORMATION OBJECTS

(75) Inventors: Marco Boerries, Los Altos Hills, CA (US); Edward Stanley Ott, IV, Sunnyvale, CA (US); Keith David Saft, San Francisco, CA (US); Marc Eliot Davis, San Francisco, CA (US); Amit Kumar, San Jose, CA (US); Erik Nis Jessen, Belmont, CA (US); Jonathan Merrel Chum, San Francisco, CA (US); George Grinsted, London (GB); Lee John Parry, San Francisco, CA (US); Adam Taggart, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 832 days.

(21) Appl. No.: 13/411,223

(22) Filed: Mar. 2, 2012

(65) Prior Publication Data

US 2012/0166925 A1 Jun. 28, 2012

Related U.S. Application Data

(63) Continuation-in-part of application No. 12/069,731, filed on Feb. 11, 2008, now Pat. No. 8,954,500, and a continuation-in-part of application No. 12/182,715, filed on Jul. 30, 2008, and a continuation-in-part of (Continued)

(51) Int. Cl.
*G06F 17/00* (2006.01)
*G06Q 30/02* (2012.01)

(52) U.S. Cl.
CPC ................... *G06Q 30/0251* (2013.01)

(58) Field of Classification Search
CPC ................... G06F 17/30864; G06F 17/30867; G06F 17/30884
USPC ........................ 715/206, 738; 707/710, 731
See application file for complete search history.

(56) References Cited

U.S. PATENT DOCUMENTS 8,566,712 B1 * 10/2013 Varian ........................ 715/273
8,880,499 B1 * 11/2014 Wu ................... G06F 17/30867
 707/710

(Continued)

FOREIGN PATENT DOCUMENTS

CN 1932756 A 3/2007
KR 10-20030094163 12/2003

OTHER PUBLICATIONS

The State Intellectual Property Office of the People's Republic of China, "Third Office Action" in application No. 200980110528.1, dated Aug. 29, 2013, 8 pages.

(Continued)

*Primary Examiner* — Scott Baderman
*Assistant Examiner* — Howard Cortes
(74) *Attorney, Agent, or Firm* — Hickman Palermo Becker Bingham LLP

(57) ABSTRACT

Information regarding a mobile user's context including but not limited to current mobile activity, social relations and associations history, and past mobile, search and browsing history is identified and converted to metadata. Metadata is also applied to content sources delivering content to a search engine or personalized content engine. The metadata is used in part to determine the relative display of content objects delivered to the mobile user as search results or a personalized aggregated information resource, e.g., home page. The user may select information, from one or more entities or search results or as presented to the user in other contexts, to be automatically delivered to the user's home page as a content feed including multiple content objects or content feeds associated with an entity. Information regarding mobile user activity is compiled and used to permit publishers and advertisers to identify target candidates to receive advertisements or marketing materials.

16 Claims, 16 Drawing Sheets

Related U.S. Application Data application No. 12/182,756, filed on Jul. 30, 2008, now Pat. No. 8,032,510, and a continuation-in-part of application No. 11/638,061, filed on Dec. 12, 2006, now Pat. No. 7,756,903, and a continuation-in-part of application No. 11/651,102, filed on Jan. 5, 2007, now Pat. No. 7,630,972, and a continuation of application No. 12/371,916, filed on Feb. 17, 2009, now Pat. No. 8,140,566.

(60) Provisional application No. 61/068,086, filed on Mar. 3, 2008, provisional application No. 61/041,590, filed on Apr. 1, 2008.

(56) References Cited

U.S. PATENT DOCUMENTS

| | | | |
|---|---|---|---|
| 2003/0110117 A1* | 6/2003 | Saidenberg | G06Q 40/06 705/36 R |
| 2003/0167315 A1* | 9/2003 | Chowdhry et al. | 709/218 |
| 2004/0030795 A1* | 2/2004 | Hesmer et al. | 709/231 |
| 2005/0097190 A1* | 5/2005 | Abdelhak | 709/217 |
| 2005/0149507 A1* | 7/2005 | Nye | 707/3 |
| 2005/0165743 A1* | 7/2005 | Bharat | G06F 17/30867 |
| 2005/0182791 A1 | 8/2005 | Lim et al. | |
| 2005/0216825 A1* | 9/2005 | Teague | 715/501.1 |
| 2005/0222989 A1 | 10/2005 | Haveliwala et al. | |
| 2006/0129533 A1* | 6/2006 | Purvis | 707/3 |
| 2006/0167896 A1 | 7/2006 | Kapur et al. | |
| 2006/0230021 A1* | 10/2006 | Diab et al. | 707/3 |
| 2006/0271834 A1* | 11/2006 | Wang | G06F 17/3089 715/236 |
| 2007/0060114 A1 | 3/2007 | Ramer et al. | |
| 2007/0061132 A1 | 3/2007 | Bodin | |
| 2007/0100653 A1 | 5/2007 | Ramer et al. | |
| 2007/0208711 A1 | 9/2007 | Rhoads et al. | |
| 2007/0239883 A1 | 10/2007 | Glenn | |
| 2007/0294646 A1* | 12/2007 | Timmons | G06F 3/147 715/864 |
| 2008/0034056 A1* | 2/2008 | Renger et al. | 709/217 |
| 2008/0125969 A1* | 5/2008 | Chen et al. | 701/211 |
| 2008/0189169 A1 | 8/2008 | Turpin et al. | |
| 2008/0301094 A1* | 12/2008 | Zhu et al. | 707/3 |
| 2008/0306913 A1* | 12/2008 | Newman et al. | 707/3 |
| 2012/0166925 A1 | 6/2012 | Boerries | |

OTHER PUBLICATIONS

Current Claims in application No. 200980110528.1, dated Aug. 2013, 3 pages.
State Intellectual Property Office of the People's Republic of China, "The Fourth Office Action", in application No. 200980110528.1, dated Mar. 24, 2014, 8 pages.
Current Claims in application No. 200980110528.1, dated Mar. 2014, 3 pages.
U.S. Appl. No. 13/078,176, filed Apr. 1, 2011, Final Office Action.
U.S. Appl. No. 12/371,919, filed Feb. 17, 2009, Final Office Action.
The Patent Office of the People's Republic of China, "Second Office Action" in application No. 200890110528.1, dated Feb. 20, 2013, 7 pages.
Current Claims in application No. 200890110528.1 dated Feb. 2013, 4 pages.
Korean Patent Office, "Notice of Preliminary Rejection" in application No. 10-2010-7024602, dated Aug. 12, 2014, 2 pages.
Claims in Korean Application No. 10-2010-7024602, dated Aug. 2014, 4 pages.
State Intellectual Property Office of the People's Republic of China, "First Office Action in application No. 200980110528.1", dated May 28, 2012.
Current Claims in application No. 200980110528.1, dated May 2012, 4 pages.
NPR Technology by Dan Charles, "GPS Is Smartening Up Your Cell Phone" © 2014 NPR, dated Sep. 25, 2006 (8 pages) http://www.npr.org/templates/story/story.php?storyId=6097216.
Koren Patent Office, "Search Report" in application No. 10-2010-7024602, dated May 29, 2014, 6 pages.
Current Claims in Koren Application No. 10-2010-7024602, dated May 2014, 4 pages.
KIPO's Notice of Preliminary Rejection in application No. 10-2010-7024602, dated Oct. 30, 2013, 3 pages.
Current Claims in application No. 10-2010-7024602, dated Oct. 2013, 5 pages.
The Patent Office of the People's Republic of China, "Rejection Decision" in application No. 200980110528.1, dated Sep. 29, 2014, 6 pages.
China Claims in application No. 200980110528.1, dated Sep. 2014, 3 pages.

* cited by examiner

| TYPE | SUBTYPE 01 | SUBTYPE 02 | SUBTYPE 03 | SUBTYPE 04 |
|---|---|---|---|---|
| PEOPLE | Entertainment | Celebrity | | |
| PEOPLE | Entertainment | Movie Actor | | |
| PEOPLE | Entertainment | Music Artist | | |
| PEOPLE | News | Newsmaker | | |
| PEOPLE | Sports | Sports Player | | |
| PEOPLE | Social | Contact | | |
| PEOPLE | Social | Connection | | |
| ORGANIZATIONS | Company | | | |
| ORGANIZATIONS | Company | Technology | Apple Computer | |
| ORGANIZATIONS | Sports | Sports League | | |
| ORGANIZATIONS | Sports | Sports Team | | |
| PLACES | Regions | City | | |
| PLACES | Regions | Country | | |
| PLACES | Regions | Neighborhood | | |
| PLACES | Venues | Entertainment | Movie Theater | |
| PLACES | Venues | Food and Drink | Restaurant | Pizza Restaurant |
| PLACES | Venues | Landmark | | |
| OBJECTS | Information Object | Entertainment | Horoscope | |
| OBJECTS | Information Object | Entertainment | Games | |
| OBJECTS | Information Object | Entertainment | TV Show | |
| OBJECTS | Information Object | Entertainment | Movie | |
| OBJECTS | Information Object | Reference | Wikipedia Entry | |
| OBJECTS | Information Object | Reference | Yahoo! Answers Entry | |
| OBJECTS | Information Object | Reference | Dictionary Entry | |
| OBJECTS | Information Object | Object Reference | URL | |
| OBJECTS | Physical Object | Commercial | Product | |
| OBJECTS | Physical Object | Transportation | Airline | |
| ACTIONS | Movement | Transportation | Walking | |
| ACTIONS | Movement | Transportation | Driving | |
| TIMES | Day Parts | Day | Morning | |
| TIMES | Day Parts | Day | Noon | |
| TIMES | Day Parts | Day | Afternoon | |
| TIMES | Day Parts | Night | | |
| TIMES | Week Parts | Weekday | | |
| TIMES | Week Parts | Weekend | | |
| TIMES | Holidays | Hanukkah | | |
| TIMES | Holidays | Chinese New Year | | |
| TIMES | Holidays | Christmas | | |
| TIMES | Holidays | Valentines Day | | |
| TIMES | Entertainment | Fashion Week | | |
| EVENTS | Politics | US Election | | |
| EVENTS | Sports | Cricket Season | | |
| EVENTS | Sports | March Madness | | |
| EVENTS | Transportation | Traffic | | |
| EVENTS | Weather | | | |

AUTOMATIC FEED CREATION FOR NON-FEED ENABLED INFORMATION OBJECTS

PRIORITY CLAIMS AND RELATED APPLICATIONS

This application claims domestic priority to the following U.S. provisional applications:
(1) U.S. Provisional Application Ser. No. 61/068,086, filed Mar. 3, 2008, entitled "OnePlace Content Aggregation, Syndication, Sharing and Updating," and
(2) U.S. Provisional Application Ser. No. 61/041,590, filed Apr. 1, 2008, entitled "Open Framework For Integrating, Associating, and Interacting With Search Results,"
This application also claims domestic priority under 35 U.S.C. §120 as a continuation-in-part of the following U.S. non-provisional applications:
(1) U.S. patent application Ser. No. 12/069,731, filed Feb. 11, 2008, now U.S. Pat. No. 8,954,500 issued Feb. 10, 2015, entitled "Identifying and Employing Latent Social Network Relationships,"
(2) U.S. patent application Ser. No. 12/182,715, filed Jul. 30, 2008, entitled "Mechanisms for Content Aggregation, Syndication, Sharing, and Updating,"
(3) U.S. patent application Ser. No. 12/182,756, filed Jul. 30, 2008, now U.S. Pat. No. 8,032,510 issued Oct. 4, 2011 entitled "Social Aspects of Content Aggregation, Syndication, Sharing, and Updating,"
(4) U.S. patent application Ser. No. 11/638,061, filed Dec. 12, 2006, now U.S. Pat. No. 7,756,903 issued Jul. 13, 2010, entitled "Configuring a Search Engine Results Page With Environment-Specific Information,"
(5) U.S. patent application Ser. No. 11/651,102, filed Jan. 5, 2007, now U.S. Pat. No. 7,630,972 issued Dec. 8, 2009, entitled "Clustered Search Processing."
This application also claims domestic priority under 35 U.S.C. §120 as a continuation of the following U.S. non-provisional application:
  (1) U.S. patent application Ser. No. 12/371,916, filed Feb. 17, 2009, now U.S. Pat. No. 8,140,566 issued Mar. 20, 2012, entitled "Open Framework For Integrating, Associating, And Interacting With Content Objects Including Automatic Feed Creation." The contents of all provisional and non-provisional applications listed above are incorporated by reference herein.

FIELD OF THE INVENTION

The present invention relates generally to search queries over a network and user configuration of feeds and clusters in conjunction with a mobile device.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Tremendous changes have been occurring in the Internet that influence our everyday lives. For example, in today's society, mobile computing devices are becoming ubiquitous. Many mobile computing devices, such as personal digital assistants, cellular phones, and the like, may be employed to communicate voice messages, emails, text messages, and so forth, as well as to search for information over the Internet. It is not uncommon to see a person on a bus, train, or boat to be using their mobile devices to search for merchants, restaurants, music, businesses, or the like. It is conceivable these devices will eventually be allowed on planes, at least for wireless Internet access.

Translating the traditional web page browsing interaction and content consumption experience to the mobile environment has generally resulted in less-than-satisfactory experiences for the user due to a variety of reasons. In a mobile device, screen real estate is at a minimum. Navigation of any presented information may be dependent upon, or subject to the quirks of, the particular mobile device. Typically, the user is not in an environment conducive to casual exploration of the World Wide Web. In fact, the user may be in a changing environment that itself demands the lion's share of the user's attention. Thus the tailoring of search engine results and content consumption to the mobile experience is of prime importance to the user.

Along with the desire to perform relevant active information searches, some mobile device users may desire delivery of content in a more automatic manner, possibly with the content tailored to a unique set of interests, such as hobbies or social network groups. Even if a user has the time, energy, and technical skills necessary to manually configure a mobile device, the user will likely be forced to remain content to receive a narrow set of pre-defined information sources, such as news headlines, weather and sports. Yet other users may desire delivery of particular content depending on the current user environment.

Similarly, advertisers desire to provide information that is tailored to each user and enhances the user experience. An advertiser can approximate this goal through delivery of advertising material as part of delivery of search engine results, because of the likely correlation between the user search terms and the user's actual interests. However, in the mobile environment when the user is not searching, advertisers typically have limited ability to reach a target audience that is likely on the move and in need of information relevant to the environment they are in or going to.

BRIEF DESCRIPTION OF THE DRAWINGS

FIG. 10 illustrates a portion of a sample use of the Add Anything Engine.

FIG. 12 illustrates a complete screen shot (with portions omitted) of a mobile device resulting from the performance operations illustrated in FIGS. 9-11;

FIG. 15 illustrates a subset of the oneSearch entity types organized by hierarchical type-subtype relations.

DETAILED DESCRIPTION

Figure 1:
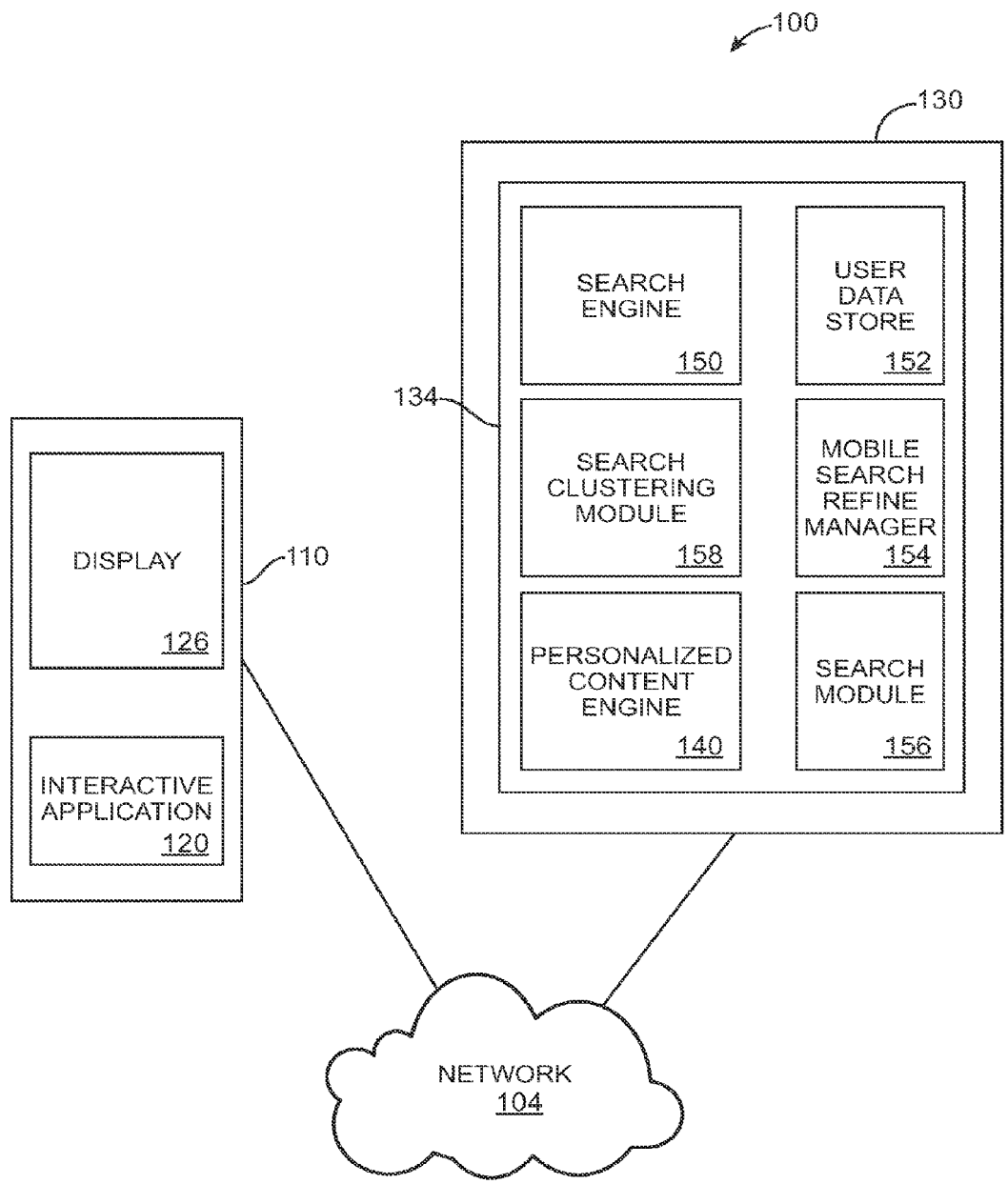
FIG. 1 is a system diagram of one embodiment of an environment in which the invention may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed herein to enrich a mobile user's personalized content consumption, web browsing and search experience by incorporating the user's current mobile activity, social relations and association histories as well as historical search and browsing data to personalize many aspects of the user's mix of mobile content and configuration of information displayed on the user's mobile device or aggregated on a personalized home page. These techniques may be automatically applied, or performed by the user. A content object may be any form or format of content that is consumable by users such as, but not limited to, any one or more of the following: text, numerical data, images, animation, audio, video or any combination thereof including content encountered as search results, through browsing or from communications with others through voice, email, text, image, animation, gesture, audio or video. Content may come from any data processing source or device.

For example, in an embodiment, contextual information related to the user's current activity is derived from the mobile device or other sources, and passed to a search engine as metadata in order to reorder generic search results into a personalized result set including a system and method for personalizing mobile user content requests, i.e., searches or dynamic page assembly requests by augmenting a mobile user's input with a first set of metadata derived from the context of the input, including location information to match the request and rank or re-rank the results In an embodiment, one or more content objects are displayed on a mobile device. For each content object selected by a user, one or more entities or entity types are determined to correlate to the selected content object. Based at least in part on the determined entity or entity type, an information feed is created. The user may incorporate the information feed into the user's home page or device and automatically receive updates based on the web page or information corresponding to the content object, entity or associated information sources.

In an embodiment, a set of search results is displayed on a mobile device. For each search result selected by a user, an entity or entity type is determined for the selected search result. Based at least in part on the determined entity or entity type, an information feed is created. The user may incorporate the information feed into the user's home page or device and automatically receive updates based on the web page or information corresponding to the search result or information resource when users annotate results to cause the future inclusion of that source, result, or search type in their mobile "home page."

In an embodiment, a set of users are ranked against a selected advertiser or product. From the set of users, candidate targets are predicted for a set of one or more advertisers and conditions, based at least in part on the context of the user, the advertisement copy and a pre-selected time for refining, qualifying and scoring users for an advertiser based upon the actual hierarchical content configurations of the user's mobile home page and the interaction and usage data of the user with the home page over time.

In an embodiment, (1) a user's content consumption and communications on the user's mobile device(s), along with (2) the preferences and activities that the user performs in configuring, consuming, interacting with, and sharing content, as well as (3) the contexts in which and the people with whom the user performs these actions, provide information to advertisers about the user's interests and intentions.

Example Operating Environments

Except where indicated, illustrated mobile and network operating environments are unnecessary for a full appreciation of various embodiments of the invention, and will not be repeated here. Such illustrated mobile and network operating environments can be found in, for example, application Ser. No. 11/651,102 entitled "Clustered Search Processing." FIG. 1 illustrates a high-level schematic of a mobile device having a web browser, with the mobile device in communication with a server. The server is connected to a network and includes a personalized content engine configured to aggregate and display disparate types and sources of content, a search engine that is configured to perform a search of the network and a user data tracking engine for instrumenting and recording user's behavior.

In FIG. 1, networked system 100 includes a mobile device 110 in communication with a server 130 using network 104. In an embodiment, the network 104 is the Internet, but it could also be a non-public network such as a telecommunications carrier. Server 130 includes a set of one or more search and data applications 134. Search and data applications 134 include personalized content engine 140, configured to generate and maintain a "home page" of personalized content types and sources in one centralized display, and search engine 150 configured to perform searches of data accessible via the network and the Internet. In an embodiment, personalized content engine 140 corresponds to is the Yahoo! onePlace mobile home page and search engine 150 is configured to search a private network of user data such as Yahoo! or Google.

Search and data applications 134 also include one or more of the following modules: User Data Store (UDS) 152, Mobile Search Refine Manager 154, Search Module 156, and Search Clustering Module 158. These particular naming conventions are not necessary from any technical standpoint to understand the methods and systems disclosed herein, but are provided for the convenience of the reader. These modules will not be described in a serial fashion, but will be introduced as certain features and embodiments are illustrated. Although each module is described separately from search engine 150, each module could be incorporated into search engine 150.

Mobile device 110 may include a mobile telephone, gaming or reading device or another wireless device (such as Wi-Fi or Bluetooth, for example) that provides access to one or more interconnected networks 104. Mobile device 110 includes an interactive application 120 that permits browsing of content and data using display 126.

Before describing an illustrated operating environment in which various embodiments may be practiced, concepts including "social relations and associations" and "metadata" are introduced and described below. Later, during discussion of various embodiments, additional refinements to these concepts may be described.

Social Relations and Associations

Social relations and associations connect people to activities and one another. A social relations and associations graph may be constructed from nearly any activity, from dating to professional organizations, with some networks not focused on a particular activity, but instead a set of personal or familial relationships.

Social relations and associations have expanded from interpersonal activities such as bowling leagues and now encompass any manner of offline or online activity and connections, typically made through the Internet and intertwined into the World Wide Web.

An individual's social relations and associations graph is not usually static, as movements and interactions among an individual and his or her social relations and associations may be a function of one or more of the following non-limiting factors: (1) where the individual is; (2) the time; (3) who the individual is interacting with, either physically or via online social relations and associations; and (4) what the individual is doing.

Many variations, combinations, and/or refinements of these factors can be relevant; for example, the individual may be planning and coordinating a family reunion involving a variety of direct and indirect personal relationships that change through time. Information related to these factors may be captured by the mobile device or by a network server. Some methods and systems for the collection and use of social relations and associations information is disclosed in both application Ser. No. 12/069,731 entitled "Identifying and Employing Latent Social Network Relationships," and application Ser. No. 12/182,756 entitled "Social Aspects of Content Aggregation, Syndication, Sharing, and Updating."

Metadata

As described above with respect to an individual's social relations and associations, a description representing an individual's current activities may include some or all of the factors relating to the "Where," the "When," the "Who," and the "What," which provide a continuous path/state data stream on the user and provide exact context for any user-originating requests such as search or loading a mobile home page. When used to describe particular data about an individual, these factors are themselves metadata called for example a user's W4 metadata including one or more of spatial metadata, temporal metadata, social metadata, object metadata and/or topical metadata.

As described herein, each of the (1) operating environment, (2) mobile client environment, (3) server environment and (4) operation of mobile search queries in conjunction with location modifiers, can be further extended with reference to metadata wrappers, including user W4 metadata, placed around data that is exchanged among mobile clients, servers, and (optionally) administrators or third party service providers.

User W4 metadata includes contextual metadata which relate to the "Where," the "When," the "Who," and/or the "What" of any given event, e.g., a text message or voice communication. That is, W4 metadata may include information which is spatial or geographic in nature (i.e., the "Where"), temporal (i.e., the "When"), social (i.e., the "Who"), and/or related to physical objects or topical interests (i.e., the "What"). In addition, the relevance of at least some of these aspects may be determined by analyzing the similarity of these aspects among user groups, as well as patterns of these similarities within and among the respective spatial, temporal, social, and topical aspects.

As described further herein, the context provided by user W4 metadata aids in the disambiguation of mobile search queries, which in turn permits improved clustering of search terms and search results.

For example, a user enters the query "apple." In addition to text in or associated with web pages and documents, the term "apple" can be mapped to a number of abstract ideas, real world objects, and digital objects and media. Collectively, these things are referred to herein as "entities." In this example, the disambiguation is performed on the string "apple" to determine at least some of the possible entities "apple" might represent, e.g., the company, the fruit, the record label, etc., each of which may then be mapped to one or more result types. In addition, disambiguation can preference recent real-world or online behavior data to preference certain results. For example, if the user was in the Apple Mac Store yesterday and made a purchase, then the disambiguation might preference local receipts or product information pages the user recently accessed in conjunction with the user's prior purchase or research.

For example, if the entity is Apple® the company, the different result types might include geographic results (e.g., company or store locations), stock price, news stories (e.g., text and video), as well as conventional web and mobile web links. As described further herein, clusters of result types based on the entity or entities identified in the disambiguation phase and their respective mappings to result types may be rendered or manipulated. Additional information regarding disambiguation of search queries can be found in application Ser. No. 11/651,102, entitled "Clustered Search Processing."

For example, FIG. 15 represents a subset of the oneSearch entity types organized by hierarchical type-subtype relations. Additional relations among entities and entity types may include numeric and symbolic relationships, as well as composite entity types such as "events" which link other entity types such as places, times, people, etc.

In FIG. 15, for example, row 1510 references the entity "Apple Computer" (corresponding to the discussion above) and row 1520 references the entity "Pizza Restaurant."

Entities may also exist in multiple categories. For example, the television series Lost could exist in the TV shows category of Entertainment Information Objects yet also be referenced in the Actor category of Entertainment People. Likewise, Pizza could be Business Listing, Venue, Place as well as a recipe entry in Wikipedia, Reference, or Information Object.

Incorporation of entities and entity types represents an important shift away from the mere bookmarking of web pages, as it permits saving pointers to entities that may have real time information feeds or for which real time information feeds may be created. For example, consider a static bookmark to the website "www.examplemovie.com", as compared to bookmarking the entity "examplemovie," from which it is possible to receive automatic updates regarding reviews, local playing times, DVD release notices, etc. relating to "examplemovie."

Sample Mobile User and Network Configurations

Various embodiments of the networked system above are now described, in which the capture and transmission of metadata is then used to enhance the mobile user browsing interaction and consumption experience.

With reference to FIG. 1, storage of metadata and other user information such as social relations and associations information may be accomplished by User Data Store (UDS) 152 that is part of search and data applications 134 on server 130. UDS 152 may include a database, text, spreadsheet, folder, file, or the like, and may be configured to maintain and store social relations and associations information as collected from network 104 as well as associated networks or user data sources. For example, a four dimensional map of a mobile device may be used as a proxy for the user's historical and current location, state and association with other nearby or related users.

In an embodiment, social relations and associations information stored in UDS 152 for a mobile user includes one or more of the following: (1) the user's identification information for social networking websites to which the user belongs, such as MySpace, Facebook, or LinkedIn; (2) contact information maintained by the user, such as for voice contact, electronic mail, instant messaging, and text messaging; (3) membership groups to which the user belongs; (4) subscriber information of individuals that subscribe to user-created content, such as subscribers to the user's Flickr account or the user's blog and (5) any other accessible source of data on the user's location, association, actions, interests or transactions.

In an embodiment, social relations and associations information stored in UDS 152 for a mobile user includes electronic communications sent or received by the mobile user, such as electronic mail, instant messaging, and text messaging, while other embodiments combine information from multiple devices, mobile and stationary to include all known data, communications and transactions for the user.

In an embodiment, location information based both on a user's actual and past path data as well as on a user's physical residence(s), account registration information, locations of interests the user has implicitly or explicitly shared with the system, or the like, may also be stored within UDS 152. Such information may indicate that the user resides in a particular town, neighborhood, city, or the like, within a particular county, state, country, or the like, or is interested in a given location (e.g. venue, district, city, region, etc.), or the like. Such location information may also be configured and arranged, in one embodiment, in a hierarchical relationship.

In an embodiment, mobile status information that is related to the user may also be stored within UDS 152. Such mobile status information may include one or more of following: (1) the name, operating system, and CPU of mobile device 110; (2) the current status, location and/or usage history of mobile device 110, such as when and how long it has been powered on and accessed as well as to which cell towers or network nodes it has been communicatively connected with; (3) status information of applications 242 loaded on or currently operating on mobile device 110, such as information related interactive application 120; (4) contents of data storage of mobile device 110; and (5) information such as coordinate history from GPS of mobile device 110, from which a user's mobile status (such as that the user is located in a slow-moving transportation device on a particular freeway) may be derived. Usage history includes both active interaction data created by the user's actions, as well as passive data such as location of the user, proximity to known landmarks or Points of Interest (POI), and association other co-present users, devices, networks, vehicles or appliances.

In an embodiment, social networking information may be obtained once a user has provided account access to the user's social network or electronic mail accounts.

In an embodiment, social relations and associations information may be obtained indirectly through monitoring various movements, actions and interactions of a user. Interactions may be monitored though use of a browser toolbar activated by the user, in which some or all data sent to mobile device 110 is forwarded to UDS 152 as well as any other known method of instrumenting a mobile device to track user interaction including orientation, biometric and motion sensing. Thus, for example, the implicit social relations and associations data and/or contact information may be extracted based on data from the users' respective devices, environmental sensors or data feeds and/or the content within a message between the user and another user whether or not they are both members of an explicit social network.

Information such as social networking information, communications information, location information, and mobile path or status information, is stored within UDS 152, and may be passed with other data as a "metadata wrapper". As described below, a metadata wrapper may provide contextual information or content information to the data in which it accompanies. A non-limiting example of a vocabulary in which metadata may be propagated, including use of properties, objects, and datatypes, is provided below in the Section entitled "Sample Metadata Vocabulary."

Information stored within UDS 152 may be passed to Mobile Search Refine Manager (MSRM) 154. MSRM 154 is configured to receive the search query from a user, parse the search query into one or more primary search terms, and provide contextual modifiers based upon information regarding the user stored within UDS 152. Additional features of MSRM 154, including processing of contextual and concept-based searches, are described in application Ser. No. 11/651,102, entitled "Clustered Search Processing."

In an embodiment, contextual modifiers are provided in a metadata wrapper passed to MSRM 154 from mobile device 110; for example, the metadata wrapper may comprise data accompanying or part of a search query sent from mobile device 110. In an embodiment, contextual modifiers are provided to MSRM 154 by UDS 152.

In an embodiment, MSRM 154 identifies any concept-specific data sources to be searched. One embodiment of a method in which third-parties may provide customizable data sources will be described later with respect to FIGS. 5-6.

Using the information stored in UDS 152, MSRM 154 then fashions a modified search query to be processed by Search Module 156, along with an indication of any concept-specific data sources to be searched.

Search results provided by Search Module 156 may be clustered into groups, and optionally ranked, as disclosed in application Ser. No. 11/651,102, entitled "Clustered Search Processing." In an embodiment, search results from Search Module 156 are then passed to Search Clustering Module 158. In an embodiment, metadata passed to Search Module 156 is also passed to Search Clustering Module 158.

Additionally, search results as determined with respect to mobile user metadata may also be modified based on metadata derived from one or both of concept-specific and content-specific data sources. The corresponding search results may be clustered by source, terms, concept or content.

For example, metadata identified by one or both UDS 152 and MSRM 154 may be matched to search results based on a matching concept-specific data source.

In an embodiment, search results are combined with other known data sources to create a "virtual cluster" that may be presented to the user in the same or a similar manner in which actual clustered results are presented to the user.

In an embodiment, concepts identified by Search Clustering Module 158 used to cluster results are attached to the results as metadata. In an embodiment, the identified concepts are used to determine a result type or relative rank based on the entity or entities identified in the disambiguation phase.

In an embodiment, metadata representing the user's mobile status information may be used to construct the layout of search results appearing on display 126 of mobile device 100.

In this manner, metadata from many different sources regarding the user and context is used to personalize the current mobile user's search or dynamic page assembly requests. Metadata describing the user's (1) current activities, (2) current environment, (3) social relations and associations, (4) third party evaluations, reputations, rankings or other quality scoring metric, e.g. credit score, etc., and (4) search query is combined with metadata generated by concept-specific, context-specific, or content-specific data sources, may be used to deliver relevant information to a mobile user.

Illustrative User Example

Figure 2:
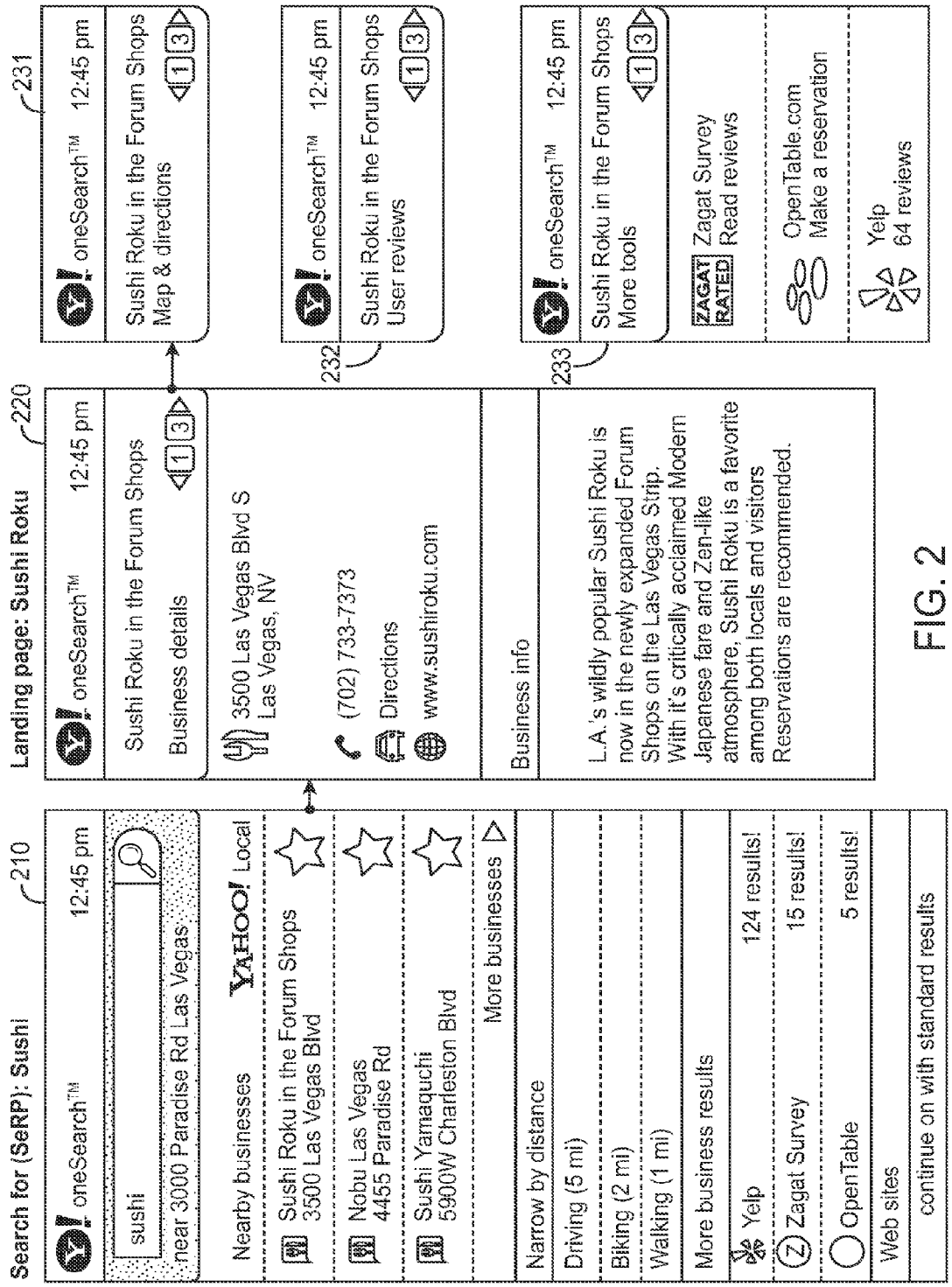
FIG. 2 illustrates a sample search and clustered search results on a mobile device.
Figure 3:
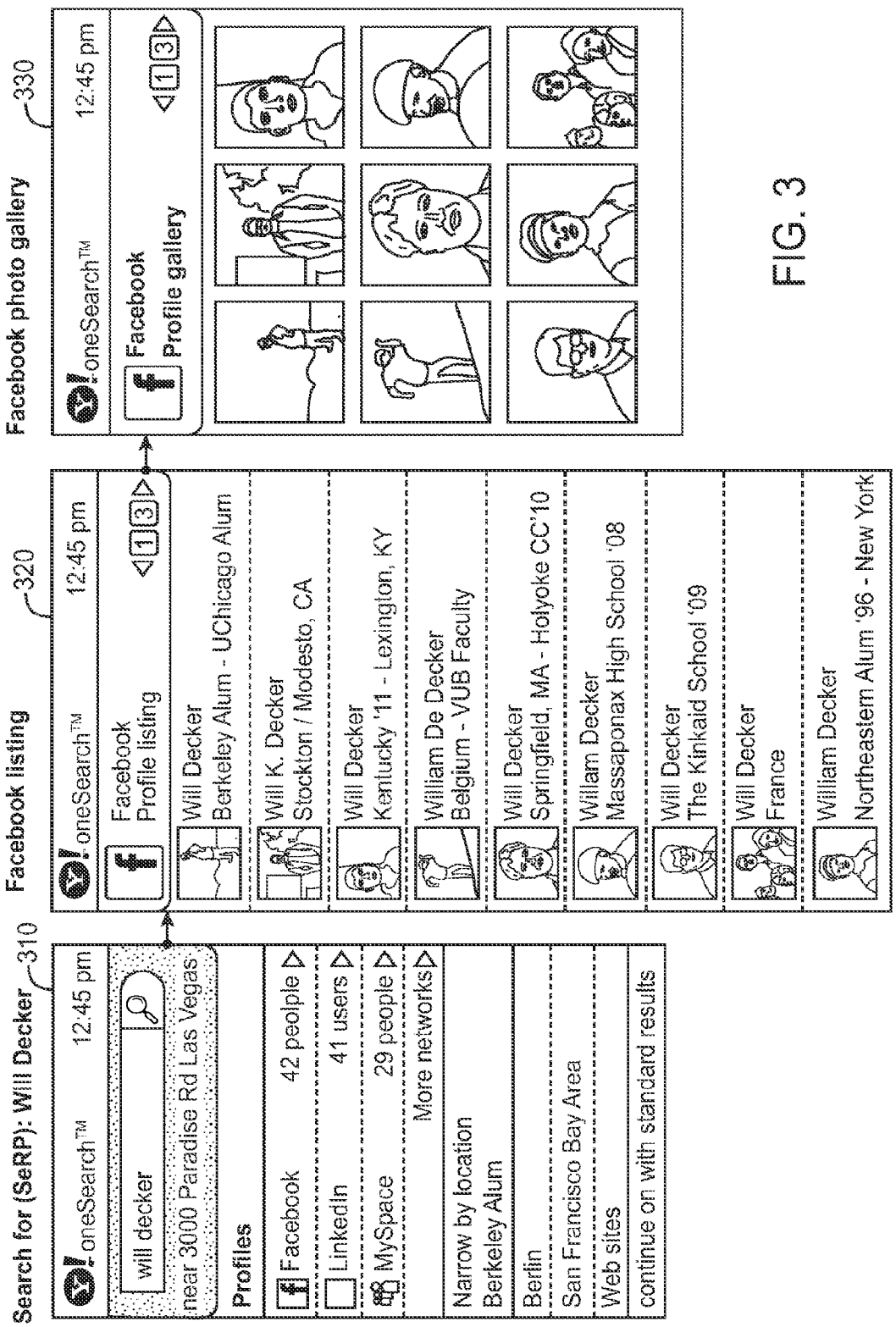
FIG. 3 illustrates the clustering achieved through the use of metadata wrappers applied in a social networking context.
Figure 4:
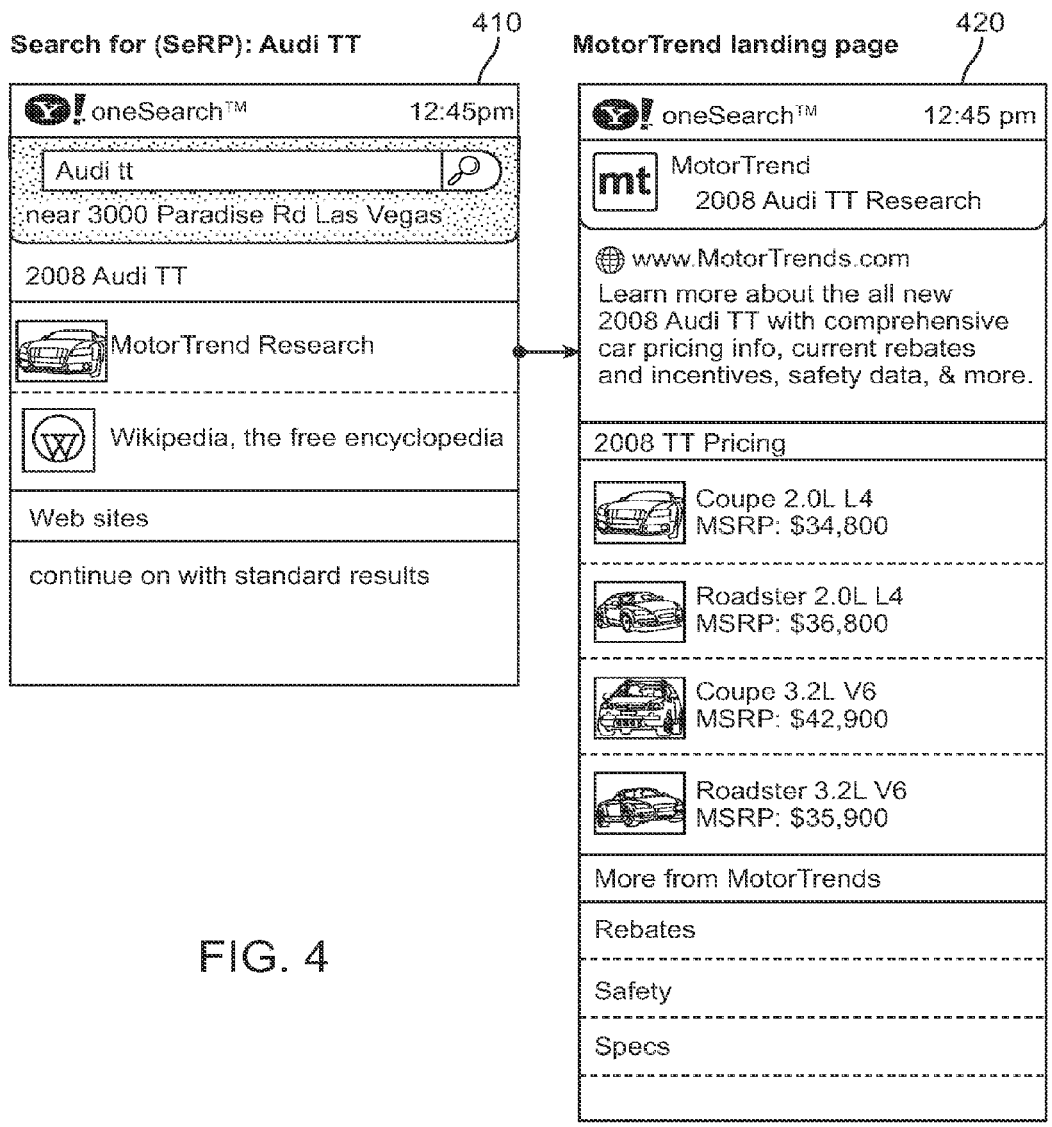
FIG. 4 illustrates the generation of results based on a search yielding no named cluster results.

Examples of clustering (a) through use of metadata related to mobile device usage, (b) in conjunction with disambiguation of strings into entities, are illustrated in FIGS. 2-4 displaying sample searches and search results on a mobile device.

With respect to FIG. 2, in panel 210, the mobile user performs a simple search using the term "sushi." Previously obtained metadata such as the user's location has been captured and is displayed below the search box; in this example, the user is located "near 3000 Paradise Rd, Las Vegas."

This location metadata permits the identification and display of nearby businesses, such as restaurants, identified as relevant to the search term. The restaurants form a cluster of particular instances of the abstract entity type "restaurant." These results can be further refined by distance, as shown in panel 210.

Advantageously, the metadata wrapper can be employed by other content providers, such as Yelp, Zagat, and OpenTable, and shown under the heading "More business results" in panel 210. These business results could be generated based on a combination of the mobile user's location, the search term, and an abstract entity type such as "restaurant," and pushed to the user.

In panel 220, the user has selected the result for "Sushi Roku in the Forum Shops," and has landed on the informational display page regarding this restaurant. Although the user is viewing details regarding a particular instance of the abstract entity "restaurant," the mobile device's display is configured to display links to other related information, such as a map, user reviews, and more tools, via the link to "Business details."

Panels 231, 232, and 233 display the links available from the landing page for "Sushi Roku." For the information shown in each panel, metadata wrappers have been applied to describe the data types of the content sources (such as "review," "review author," "photo," "rating," etc.)

FIG. 3 illustrates the clustering achieved through the use of metadata wrappers applied in a social networking context. Panel 310 illustrates a search performed by the user for a person named "Will Decker." This search may again being performed with reference to the user's current location, as shown in the location information ("near 3000 Paradise Rd, Las Vegas") below the search box. The search generates a cluster of profile information using the abstract class "Contact" with regard to three applications, Facebook, LinkedIn, and MySpace. In this example, data (including metadata wrappers) from these three applications is pulled from each through an open API framework and assembled by the server.

Additionally shown in panel 310, each of the instances of the "Contact" class type possess properties that can be used to further refine the results and aid the user in locating the individual named "Will Decker" that he or she actually knows.

In panel 320, the user has selected the profiles found in Facebook and views a summary of the various people named "Will Decker" (or a slight variant thereof) along with additional information, such as a thumbnail photo and an encapsulated summary about the individual, such as "Berkeley Alum•UChicago Alum," corresponding to the class "Overview."

In panel 330, the user has navigated to a representation of Facebook photo gallery for a particular instance of "Will Decker." Metadata wrappers including photograph information may be applied by the API framework, and combined with information regarding the mobile device physical features, to present the various Facebook photographs in an attractive manner.

FIG. 4 illustrates the generation of results based on a search yielding no named cluster results, in which the user is presented with one or more unnamed, virtual clusters, which themselves may comprise one or more third-party open abstracts. In panel 410, a mobile user enters the search term "Audi tt." While none of the search results yield a named cluster, a virtual cluster entitled "2008 Audi TT" is created using content supplied from MotorTrend and Wikipedia conforming to the open abstracts model.

In panel 420, the user has selected the MotorTrend Research icon and is presented with a landing page assembled from data and metadata that may be (1) supplied from results obtained from general data sources, or (2) supplied from a MotorTrend API plug-in. Other possibilities for generation of results include one or more of the following: (1) generation of a virtual cluster; (2) generation of a series of virtual clusters; and (3) a list of OpenAbstracts that is not clustered but meets at least one relevancy criterion.

Integrating Content Sources into the Mobile Search Framework

In the illustration provided above in FIGS. 2-4, cluster data from Facebook, LinkedIn, and MySpace may have been: (1) provided to the server via a browser toolbar, or (2) pulled from each website through an open API framework and assembled by the server. A framework for this integration of content sources and simple schematics for the cluster generation via third-party content sources are illustrated in FIGS. 5-6 and described below.

Figure 5:
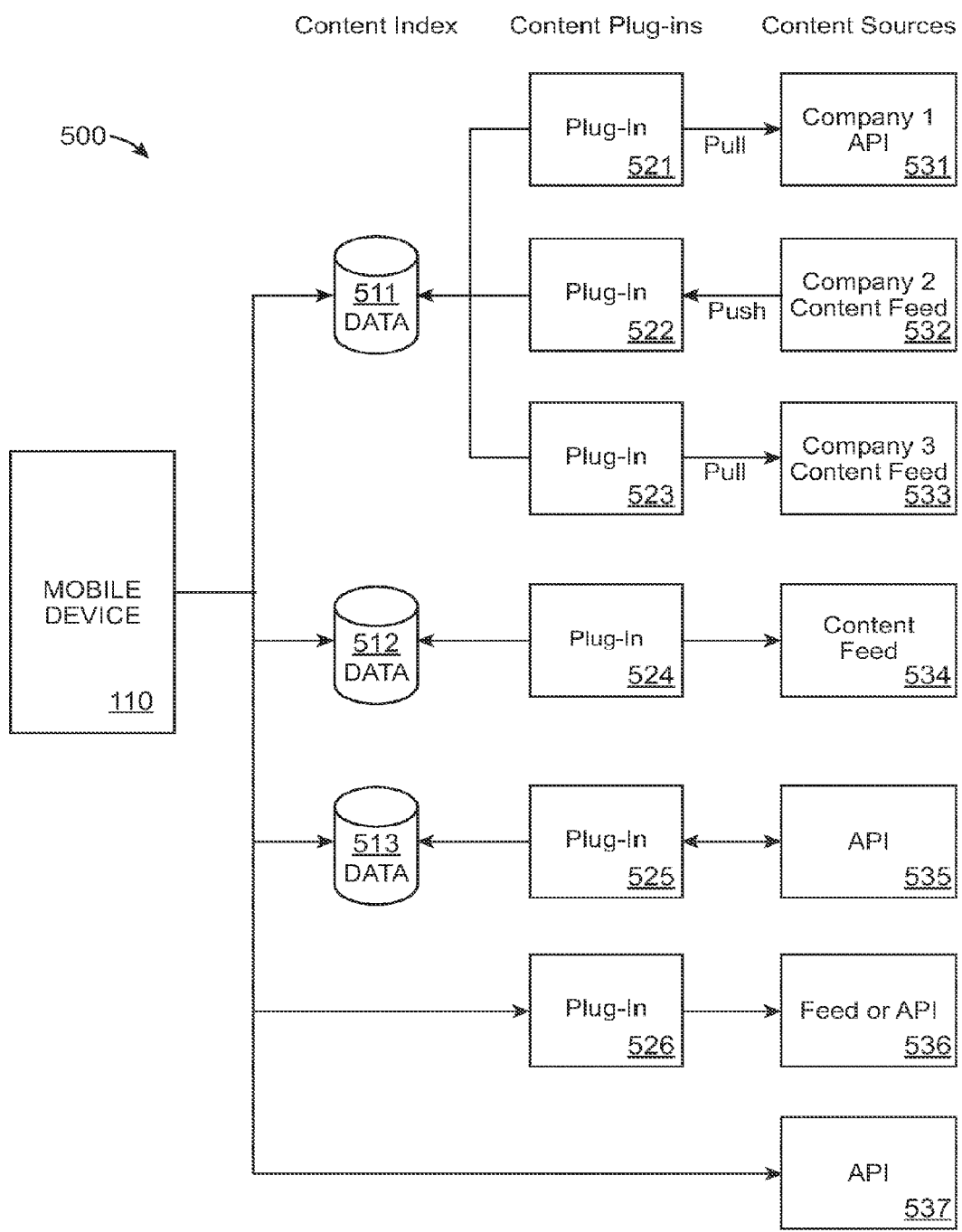
FIG. 5 illustrates a mobile user search system performing a federated query to multiple data sources in which third parties provide plug in modules to interpret their data into a format usable by the search.

FIG. 5 illustrates a mobile search system 500 performing a federated query to multiple data sources in which third parties provide plug in modules to interpret their data into a format usable by the search or personalized content processes. The search retrieves data (and associated metadata) in data stores 511, 512, 513 that comprise a "Content Index." Data is passed to the Content Index from content plug-ins 521-524 described below with reference to FIG. 6. Results in mobile search system 500 are also pulled directly from content plug in 526.

Each of plug-ins 521-525 either pull data from, or are pushed data by, content sources 531-536. Content sources may comprise application program interfaces (APIs) and/or content feeds. Additionally, results in mobile search system 500 are also pulled directly by content source 537, which comprises an application program interface (API). As illustrated, data may be pulled from an API or content feed from a third party provider to the plug-in; or data may be pushed to the plug via a third party provider's content feed.

Figure 6:
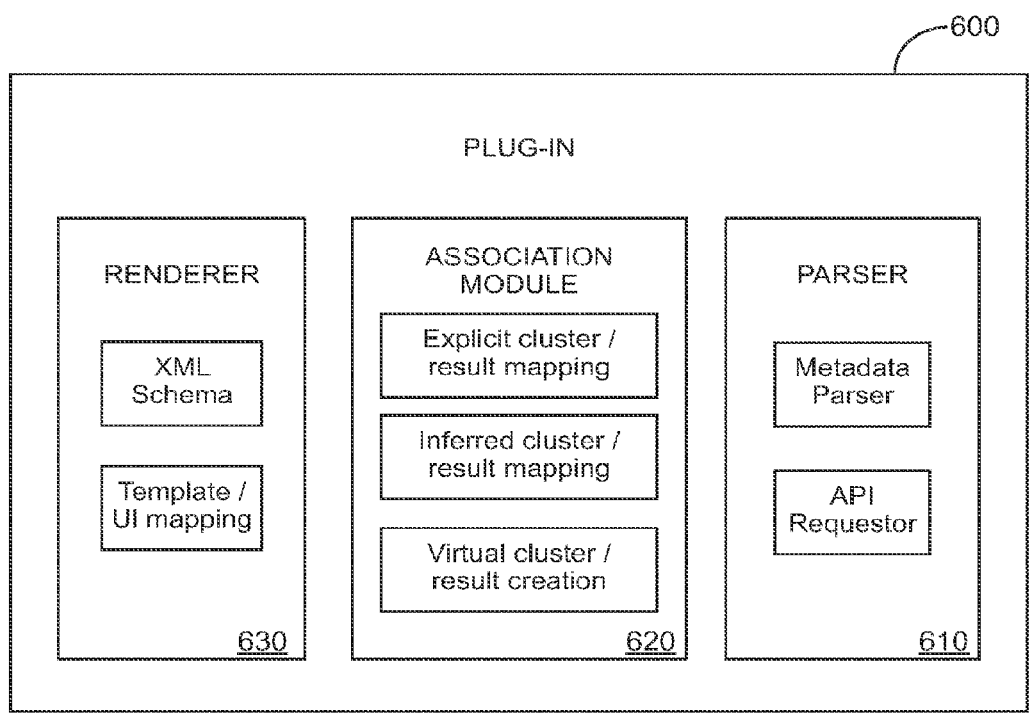
FIG. 6 illustrates a sample framework for the plug-ins shown in FIG. 5.

FIG. 6 illustrates a sample framework for a plug-in shown in FIG. 5. Plug-in 600 comprises parser 610, an association module 620, and renderer 630. Parser 610 may comprise a metadata parser or API Requestor, one or both communicating with one or more of the "Content Sources" shown on FIG. 5. Parsed data, including optional metadata wrappers, are passed from parser 610 to association module 620. Explicit and inferred cluster result mapping is performed by association module 620, with results processed by renderer 630. Results in the renderer may be processed through an XML schema or a template/user interface mapping, providing metadata wrappers (such as clusterIDs, entityIDs, W4 metadata, and content type metadata) that permit the system to determine the appropriate format, rendering, and user actions for the content shown on the mobile device. Results are then sent to one or more data stores that comprise the "Content Index" of FIG. 5.

Incorporation of Search Sources or Results into a Home Page

In the description above, various forms of metadata are used to derive search results from a corresponding search query. The search results may represent various types of content, such as text, numerical data, image, animation, audio or video and formats of content such as an RSS feed, a link to a newspaper article, a Wikipedia entry, or portions of a web page. The user may desire to incorporate one or more search results into the user's home page or mobile home page that automatically appears when a browser or application is first invoked, or is invoked when the user activates a "home" command of some type.

Additionally, a search result, or portion of a search result, may itself be considered an entity or entity type as previously described; for example, a web link or RSS feed may be added to, and treated as, an entity or entity type on the user's home page. Items which may be added include: (1) web links; (2) RSS feeds; (3) web links for which RSS feeds are created based on periodically revisiting the link to check for updates; (4) "entity" or "entity type"; and (5) entities or entity types added through the parsing of a web link or RSS feed.

As a non-limiting example, a user may select a search result or any online web page or resource for future inclusion, or the user may also add the entity or entities represented within that content to the user's personalized content engine. At the time of the user's selection, the personalized content engine may automatically or interactively determine whether the user wishes to add that content, resource, or feed, among one or multiple associated entities.

Such desirable features may be accomplished via display of search results or content objects with an associated icon, checkbox, user gesture, or associated spoken command that when selected or spoken, determines a content type for the selected results and creates a corresponding information feed to be incorporated in the user's home page or consumption device, e.g., electronic book reading device, or gaming device. The ability for the user to add any search results as an information feed is now described with reference to FIG. 7.

Figure 7:
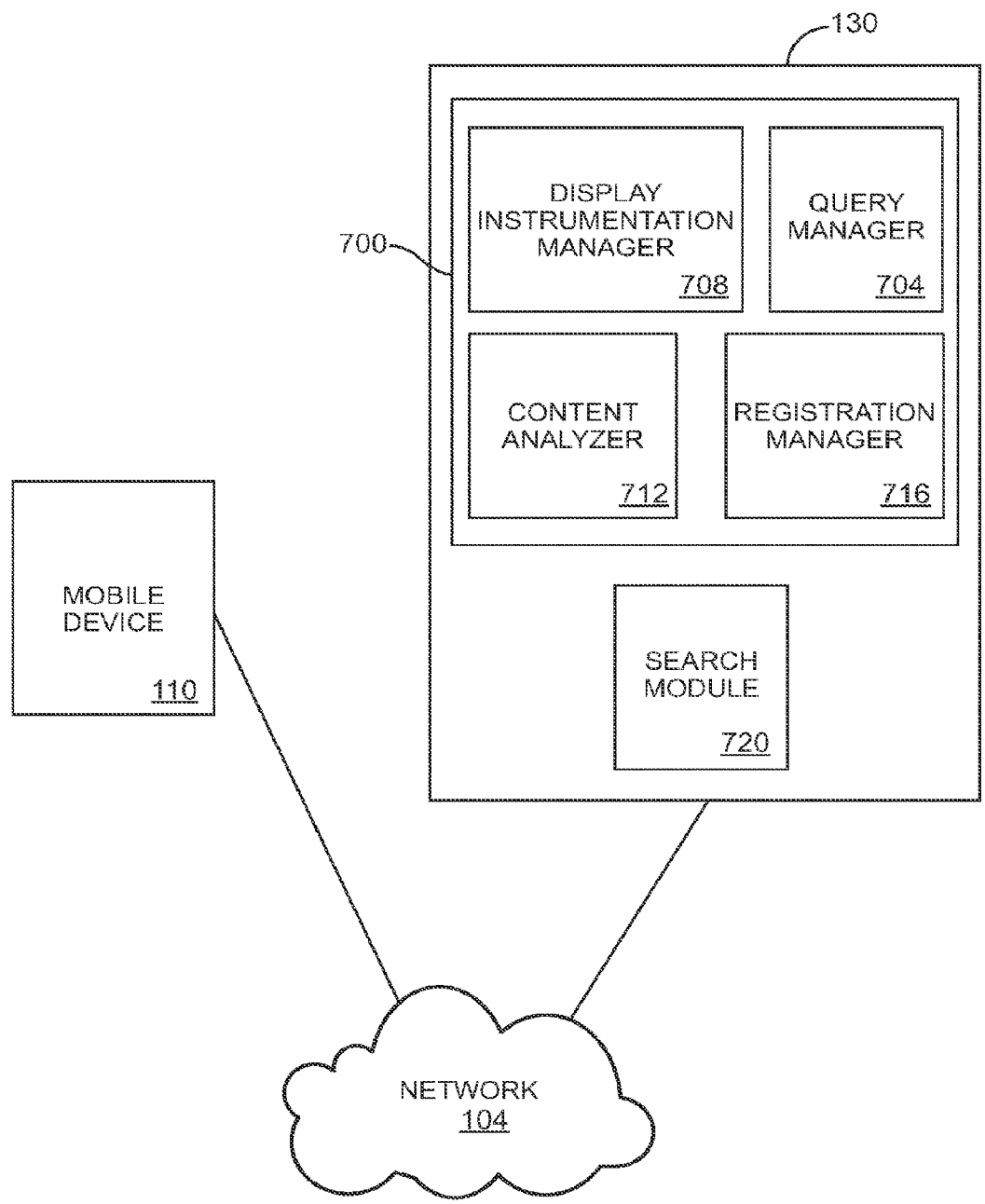
FIG. 7 illustrates a schematic of an Add Anything Engine.

FIG. 7 illustrates four components of Add Anything Engine 700 that may be used to permit the user to add search results to the user's home page or other information aggregation location or device. It should be understood that the elements in FIG. 7 may be easily incorporated in server 130 shown in FIG. 1. For example, Add Anything Engine 700 may be incorporated into search and data applications 134 on server 130. For simplicity, the description below will be made with reference to FIG. 7.

Add Anything Engine 700 includes Query Manager 704, Display Instrumentation Manager 708, Content Analyzer 712, and Registration Manager 716.

Query Manager 704 tracks search query information and related metadata of one or more usage data sets or search histories of the user as well as across any number of devices or networks associated with the user.

In an embodiment, Query Manager 704 receives information from UDS 152 and MSRM 154.

Information from Query Manager 704 is supplied to Content Analyzer 712 for use in determination of the particular content type or format to be associated with the corresponding search result. Content Analyzer 712 parses received web links and RSS feeds for determination of the corresponding entity and entity type.

Some search results, such as RSS feeds, have established protocols for updates, whereas other search results, such as to a static web page, may not have an established update protocols. Content Analyzer 712 forwards results corresponding to such a static content type to Registration Manager 716.

Registration Manager 716 may create a recurring information feed out of a non-feed enabled information object so that the user receives updated information from the corresponding link at various intervals. For example, the user may desire to view web page announcements made by government agencies, such as the United States Patent and Trademark Office, that do not provide web feeds.

In an embodiment, Registration Manager 716 includes instructions to periodically fetch the data source corresponding to the non-feed enabled information object selected by the user, parse the resulting data, and apply metadata wrappers.

Registration Manager 716 forwards any recurring information feeds to Mobile Homepage Manager 720 for display on mobile device 110.

Display Instrumentation Manager 708 controls both the actual display of the "add this" icons and receipt of corresponding user input. Display Instrumentation Manager 708 forwards selected known information feeds to Mobile Homepage Manager 720 and forwards other user selections to Registration Manager 716 for feed creation. Display Instrumentation Manager 708 may also be configured to sense spoken commands and/or user gestures for selecting selected known information feeds to Mobile Homepage Manager 720 and Registration Manager 716 for feed creation.

FIGS. 9-13 illustrate an illustrative mobile home page environment and one manner in which a user may add an entity to a mobile device home page. Panel 910 displays a portion a mobile device screen from which the user may add content to the user's home page, first by activating the entry entitled "Add Anything to Y! onePlace." After activation, the user is presented with panel 920. Panel 920 includes area 921 for the user to input text for a personalized search, with entries at area 921 corresponding to a default set of locations from which to add content. Therefore, the "Add Anything" capability may be applied to search queries entered by the user and/or to preselected or customized sets of content objects (entities, links, RSS feeds, etc.) presented to the user without requiring the user to enter a search query, but which may utilize contextual and other information about the user, the available entities, and the device, to present one or more customized and/or personalized content objects for possible addition to the user's mobile home page.

Figure 10:
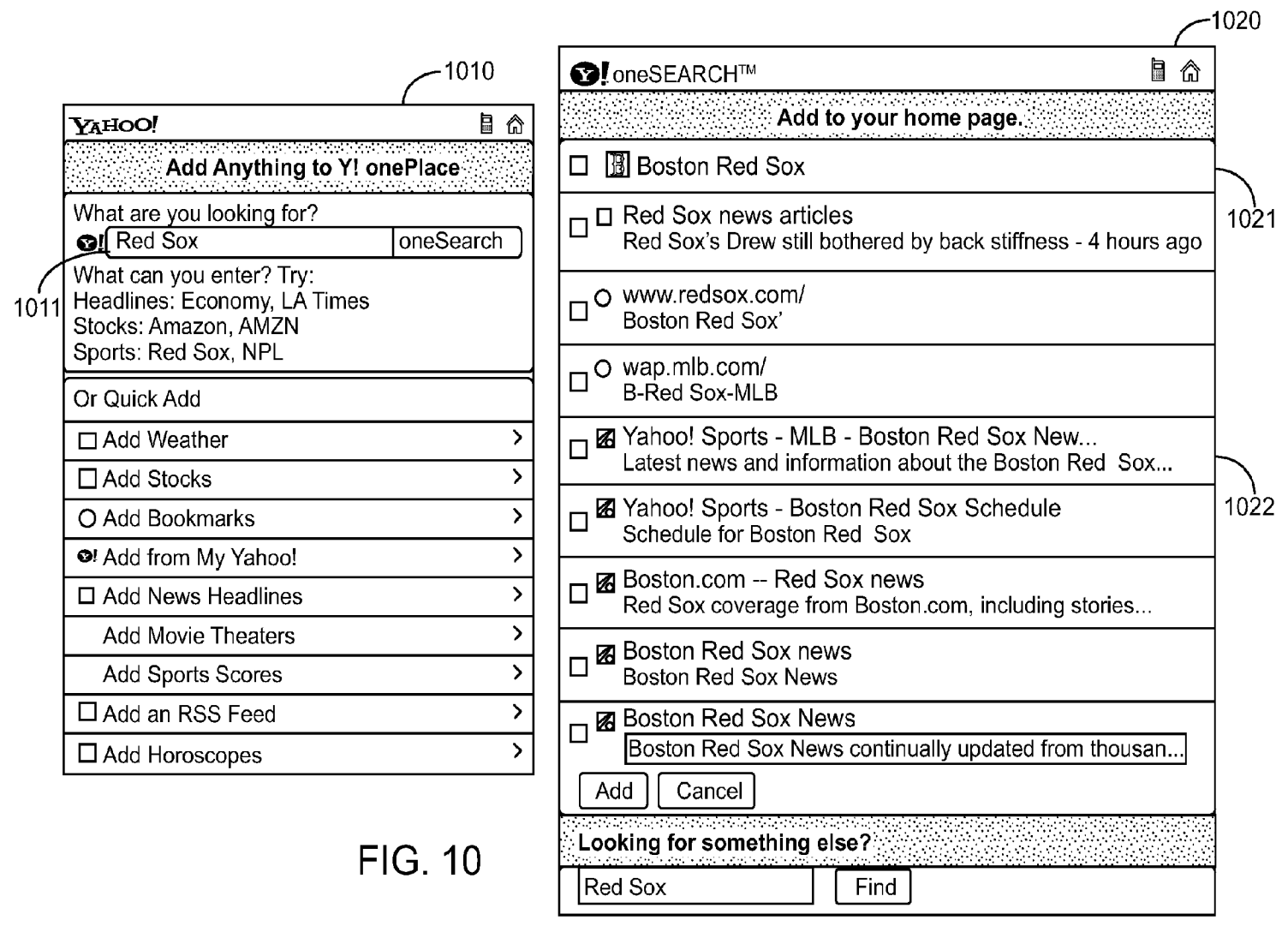

Continuing to FIG. 10, the user viewing panel 1010 has input the text "Red Sox" at area 1011. After activation of the "oneSearch" button in panel 1010, the user is presented with panel 1020, offering the user a variety of choices from which to select one or more content objects to add content to the user's mobile home page. Some choices, such as area 1022 correspond to an RSS feed that the user may select. Other choices correspond to news articles and links to web sites, for example "www.redsox.com." Area 1021 corresponds to the entity "Boston Red Sox," which may be associated with one or more information owners, publishers or authors clustered together as described in more detail in Ser. No. 11/651,102, filed Jan. 5, 2007, entitled "Clustered Search Processing" and previously incorporated by reference.

Figure 11:
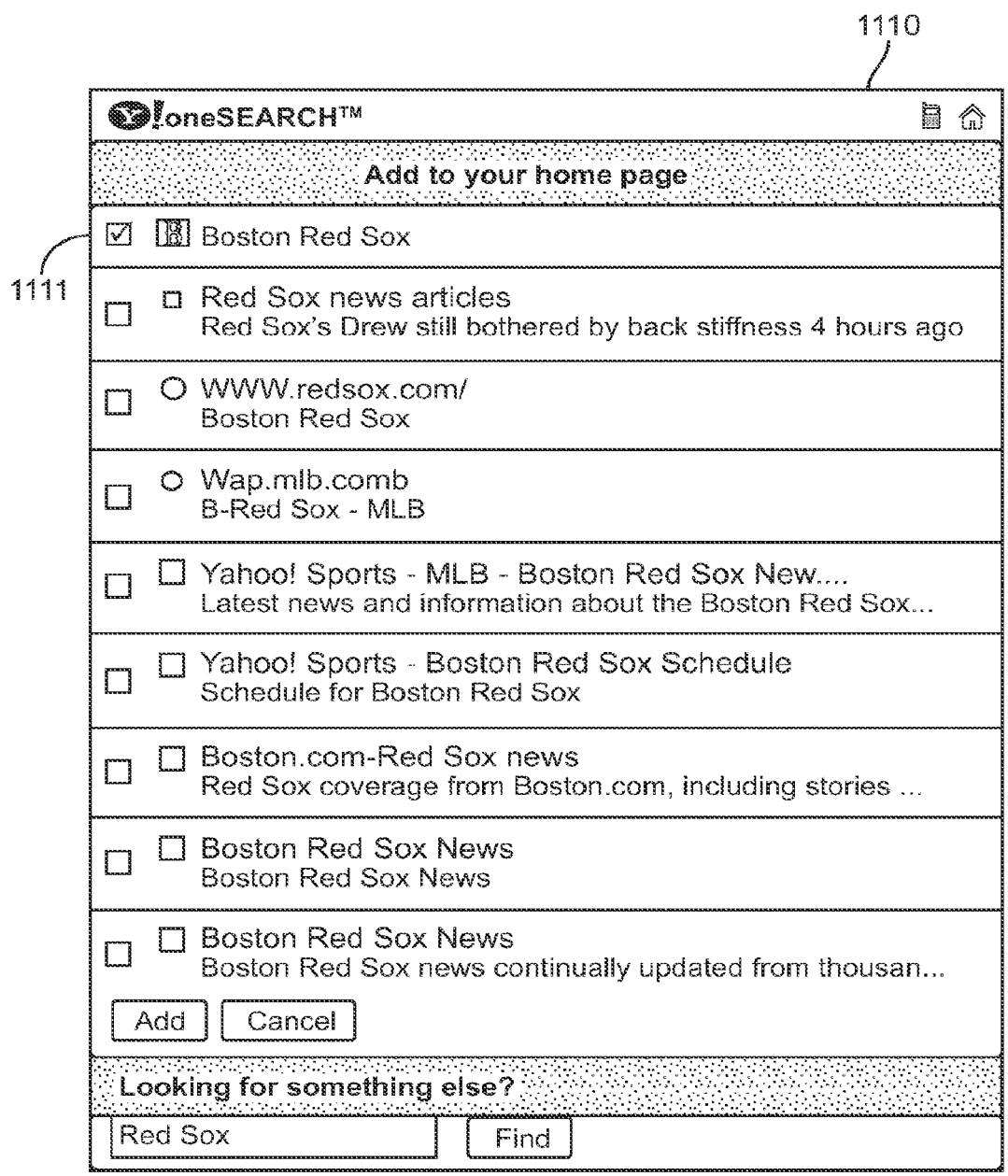
FIG. 11 illustrates a portion of a sample use of the Add Anything Engine.

In FIG. 11, the user in panel 1110 has selected the first entry 1111 corresponding to the entity "Boston Red Sox" to be added to the user's home page. In an embodiment, a default set of content and sources is automatically generated by default. In an embodiment, the user may specifically select or unselect content sources or objects from those associated with the user's subscription to the entity "Boston Red Sox" in order to assemble an individualized set of aggregated content and sources associated with both the entity and the user. In an embodiment, content associated with entities may be free or fee-based, anonymous or registered depending on the topic and standards of practice.

Figure 12:
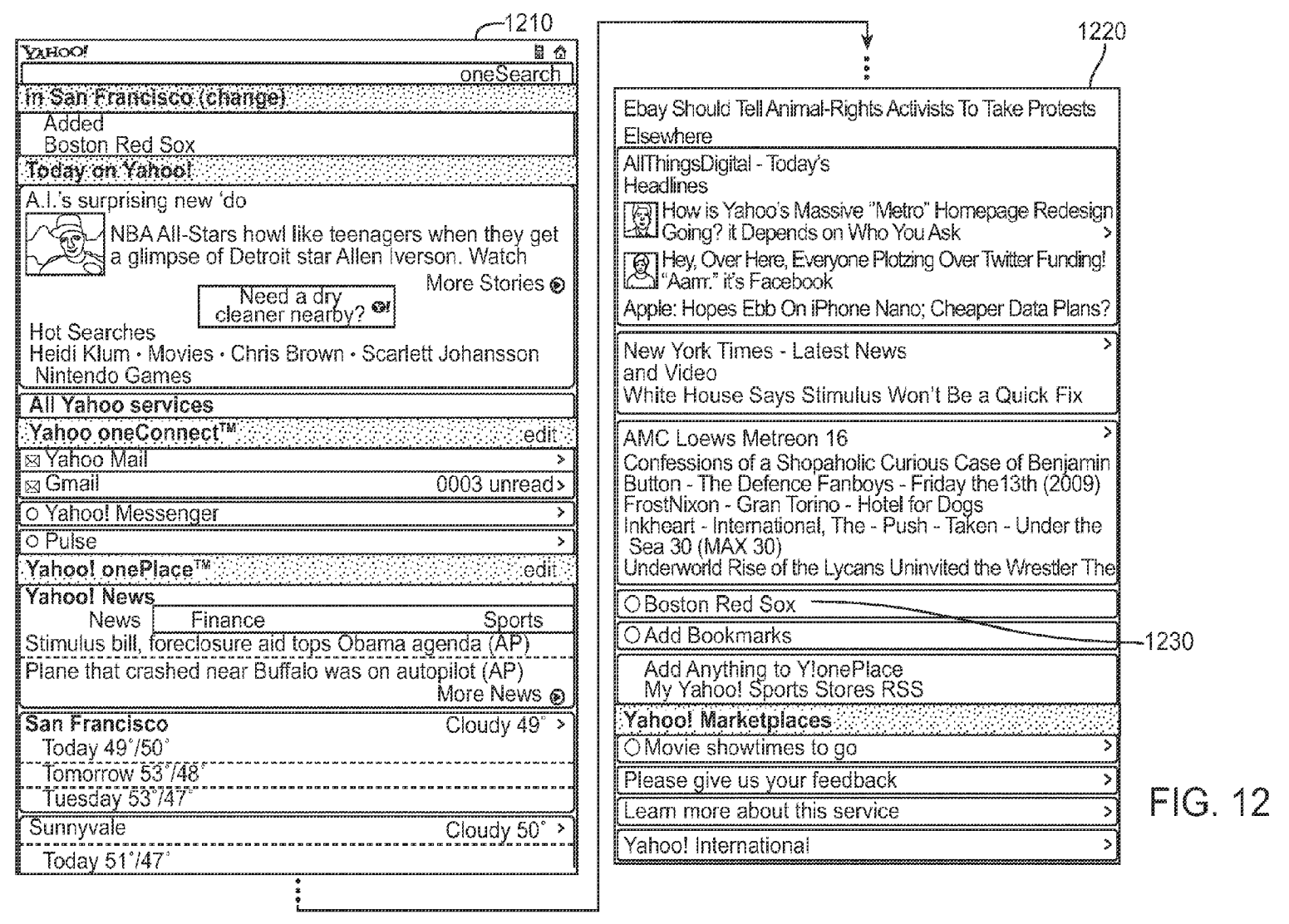

A screenshot illustrating the beginning and ending of the user's home page is shown in FIG. 12. As the screenshot is too long to be adequately displayed herein, panel 1210 represents the 'top' of the home page. The page scrolls down until panel 1220, representing the 'bottom' of the home page, is reached. As indicated in area 1230, an icon representing the entity "Boston Red Sox" has been added to the user's home page, providing the user with an easily accessible manner in which to view the system's latest personalized set of content corresponding to the Boston Red Sox.

Figure 13:
FIG. 13 illustrates information associated with the entity "Boston Red Sox"

In FIG. 13, panel 1310 illustrates content assembled by the system corresponding to the entity "Boston Red Sox." In FIG. 13, the system has added content sources corresponding to score and schedules, upcoming games, news, photos, and a roster. Unlike mere bookmarks, each of these content sources is dynamic, and information from each source may be automatically retrieved and assembled for the user's consumption. The selection and presentation of the associated content objects and feeds for a given entity may also be dynamically altered (i.e., removed, reordered, transcoded into different media types, etc.) based on preferences or actions of the system, the content publisher, the user, an advertiser, the network operator, the device manufacturer, or any combination thereof, as well as related to the various aspects of context described above (i.e., spatial, temporal, social, topical, etc.) in which the associated content objects and feeds for a given entity may be accessed by a user.

Figure 14:
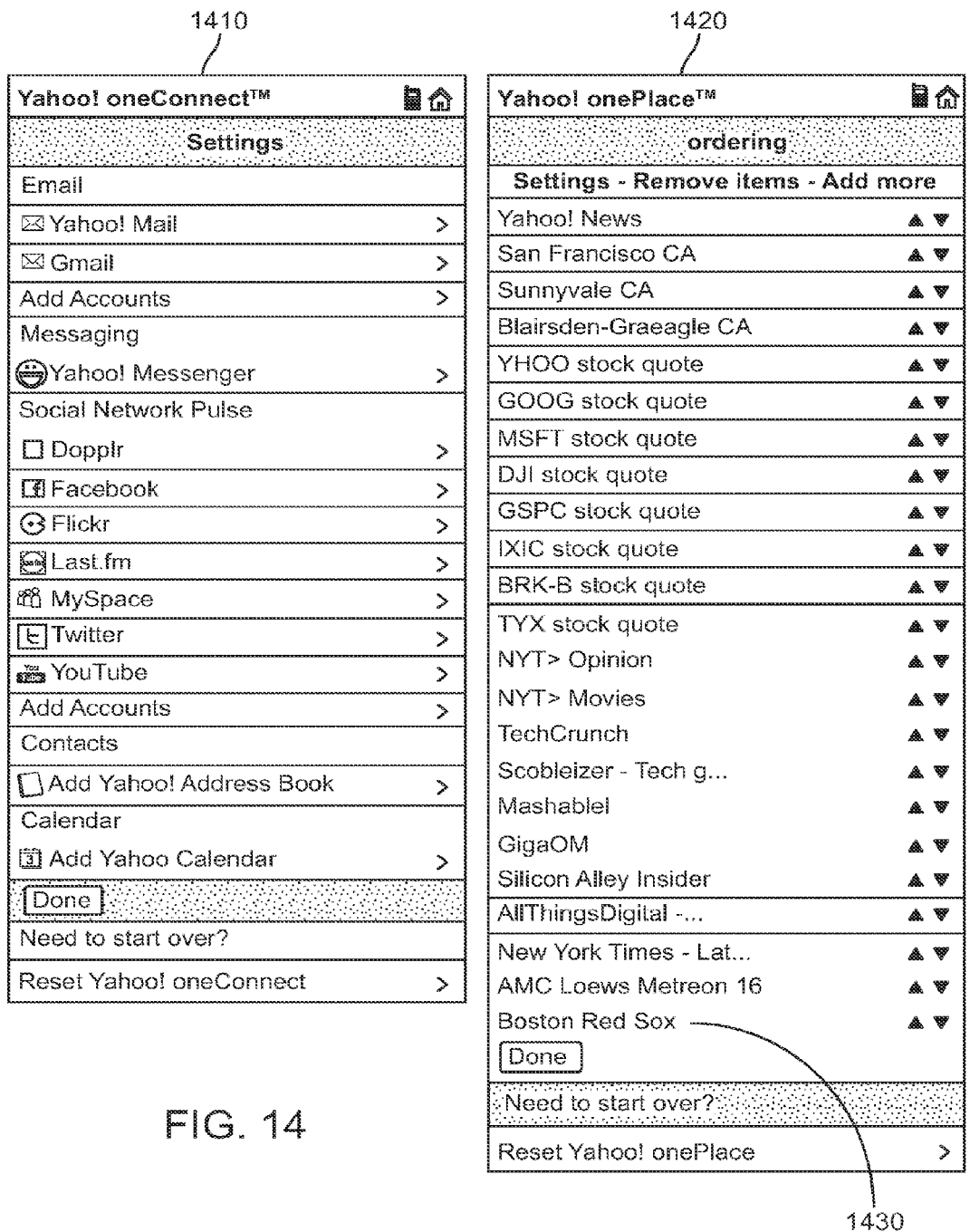
FIG. 14 illustrates user configuration screens used in conjunction with various embodiments of the invention.

FIG. 14 illustrates two views in which the user may reconfigure the user's mobile home page, including the relative order in which items appear. Entry 1430 "Boston Red Sox" demonstrates the new entity added to the user's current content ordering of their mobile home page and the associated arrows allow the user to interactively remove, raise or lower the order of any entity or content on the list. In an embodiment, the user may group, name groups, and delete or reorder groups of any entity or content on the list.

Advertisement Personalization

The dynamic mobile user web browsing interaction and content consumption experience differs greatly from the traditional, static methods of web browsing typically performed on a personal computer tied to home or work. Attempts to squeeze the traditional web browsing interaction and content consumption experience onto a small mobile screen fail to offer the benefits afforded by the methods and systems disclosed above.

Similarly, use of traditional techniques to squeeze advertising material onto the mobile screen lead to a negative user experience. The traditional techniques lead to 'one-size-fits-all' advertisements that intrude on user experience rather than accentuate it.

Significant improvements are afforded in which actual mobile user history is used to (a) rank mobile users against brand and/or advertiser, and (b) predict specific users for specific advertisers at a specific campaign and time and/or space combination for delivery. A method and system for matching advertisements with mobile users is described below with reference to FIG. 8.

Figure 8:
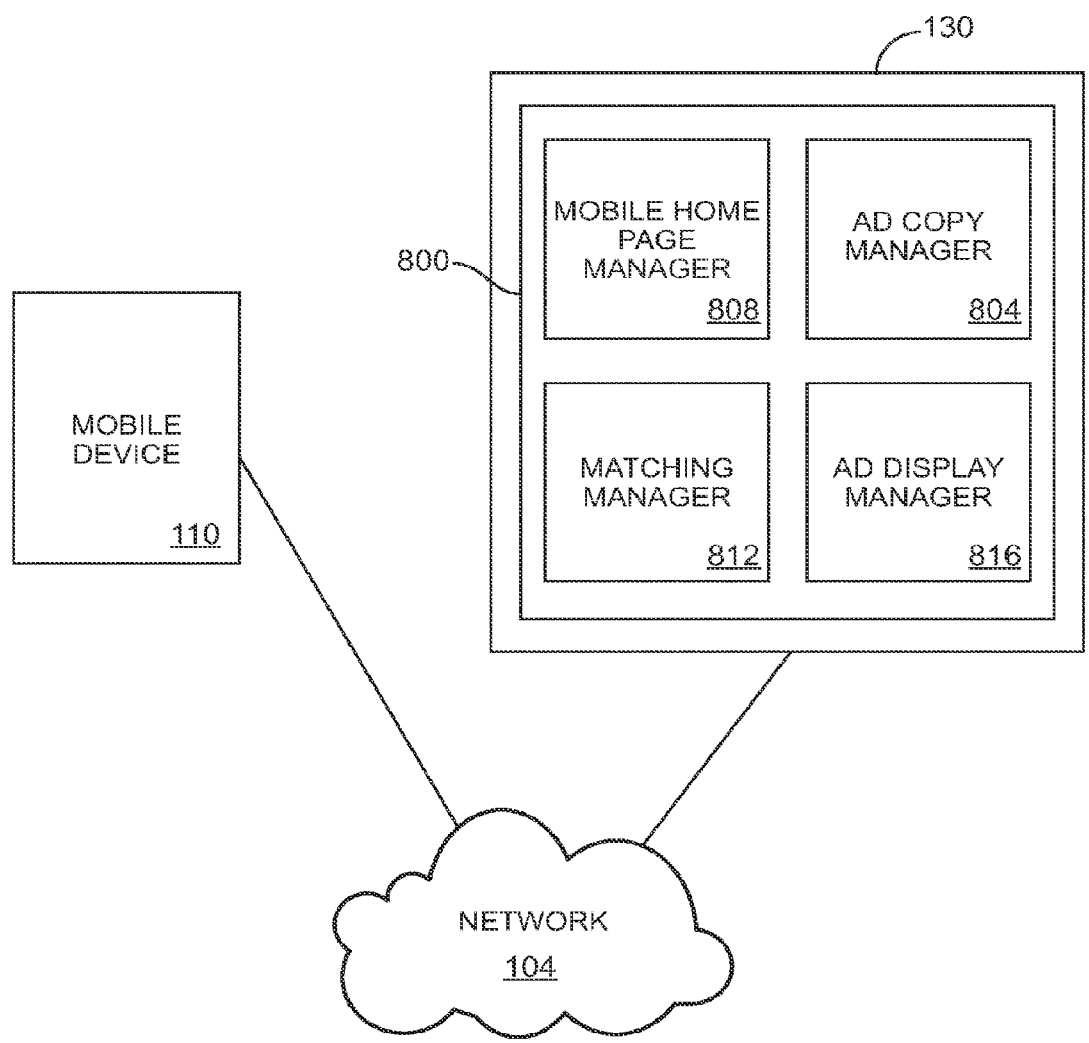
FIG. 8 illustrates a schematic of a Mobile Homepage Targeting Engine.
Figure 9:
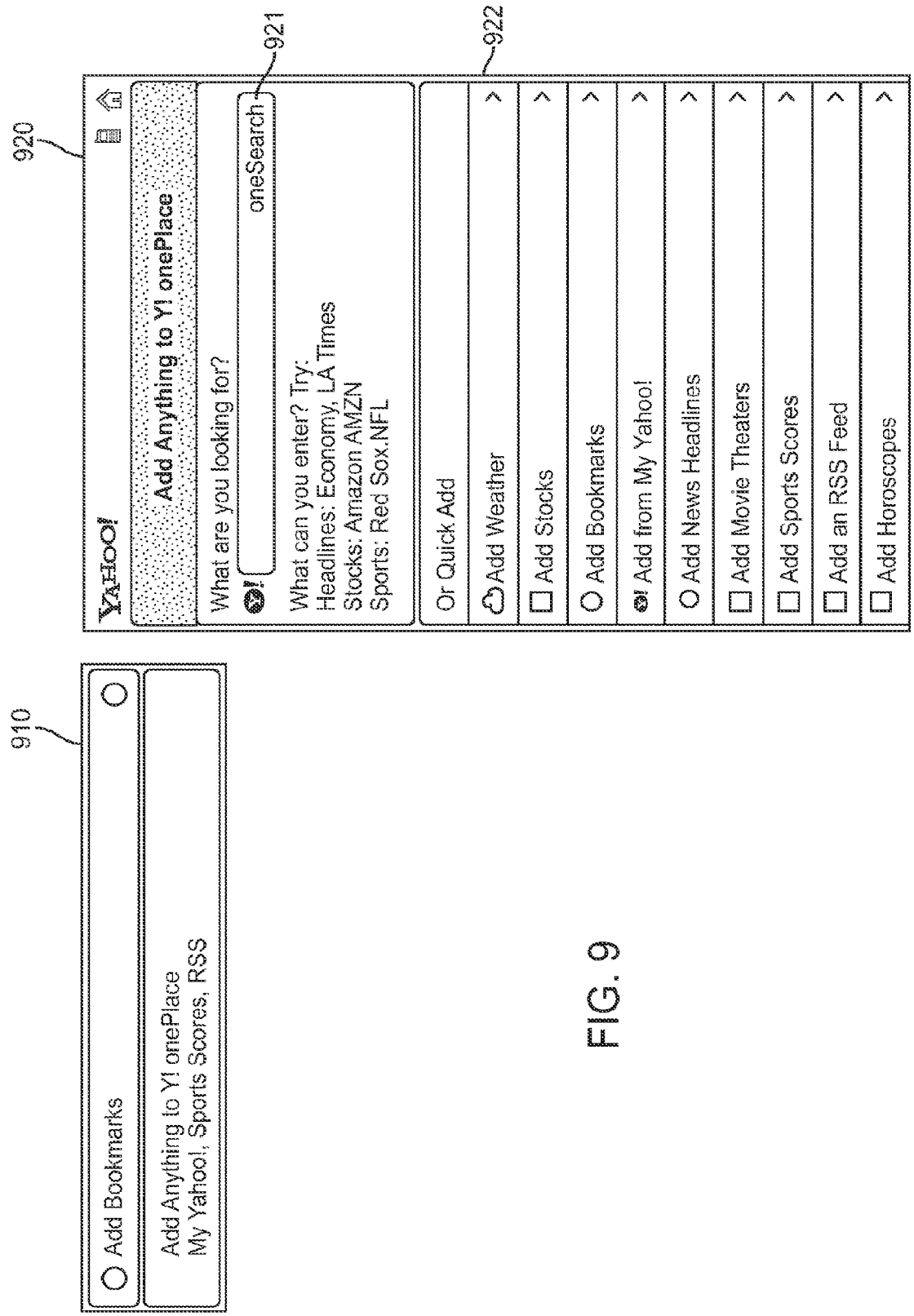
FIG. 9 illustrates a portion of a sample use of the Add Anything Engine.

FIG. 8 illustrates a Mobile Homepage Targeting Engine (MHTE) 800, a fully customizable personal advertising system for matching specific ad copy or specialized content to specific ad or content delivery opportunities based upon at least the content, format, configuration and interaction data created by users and their mobile home pages, such as Yahoo's onePlace. It should be understood that the elements in FIG. 8 may be easily incorporated in search and data applications on server 130.

MHTE 800 may include modules for: (a) managing interaction with advertisers and publishers; and (b) configuring a user's mobile home page with ad serving requests generated by one or more of the following: (1) network; (2) users; and (3) third parties.

In an embodiment, MHTE 800 includes Ad Copy Manager 804, Mobile Home Page Manager 808, Matching Manager 812, and Ad Display Manager 816.

Ad Copy Manager 804 interacts with advertisers or publishers, and may permit advertisers or publishers to perform one or more of the following: (1) register and manage their accounts; (2) submit ad copy or specialized content; and (3) specify desired actions in the form of targeting models. Specialized content may be any form of new, updated or exclusive content marketed to the user by an owner, publisher or content retailer. A targeting model may be a function of one or more of the following user characteristics: (1) type of mobile access device; (2) access network; (3) demographic; (4) current user activity; (5) location or proximity to one or more known persons, places or things; (6) co-presence of other users, devices or POI, and (7) user history, preferences, or profile, among others.

Ad Display Manager 816 responds to specific ad requests whether from the user, the network or a third party service, e.g., carrier or ISP to populate Ad copy or specialized content received from the Ad Copy Manager 804 as instructed by the Matching Manager 812 and returns the instrumented copy for display by the requesting party. Such an ad request may include information indicating the desired target user criteria, the amount or maximum amount the advertiser is willing to pay, limitations or conditions of display, and the duration of the offer.

Mobile Homepage Manager 808 instruments and tracks user content, configuration and interaction with the user's mobile home page or other selected web page including spoken, tactile and sensed inputs.

Matching Manager 812 applies targeting models to user profiles to qualify, score and select ad copy or specialized content for serving in response to ad requests handled by Ad Display Manager 816. Data from Mobile Homepage Manager 808 may be forwarded to Matching Manager 812 for refinement or construction of various ad targeting models.

The following non-limiting examples illustrate some of the benefits afforded by MHTE 800. In a first example, the user has added "Pizza Restaurant" as an entity to onePlace, in order to receive updates such as special promotions, recent reviews, grand openings or any other content, feed or source of information relevant to the entity in the vicinity of the potential target user's current location, home, work or other locations of interest, e.g., regularly visited cities, locations designated of interest by the user, etc. Such an entity "Pizza Restaurant" appears as row 1520 in the non-limiting sample subset of oneSearch entity types illustrated in FIG. 15. The user would be then considered by MHTE 800 as a potential target eligible to receive customized advertising materials or specialized content.

After the user has added "Pizza Restaurant" as an entity on onePlace, the user would then receive updates when any local pizza restaurants publish new specials or content, when a review is written about a pizza restaurant and/or when a new pizza restaurant opens up near a location of interest. Additional qualification may be achieved by noting the user's other entities on onePlace, and the placement of these and related entities on the home page relative to each other as well as discarded, rejected or unchosen content. The level and type of user activity associated with each entity over time may be used to determine each entity's relative value in targeting advertising or specialized content to that user. Content targeting from publishers, as well as ad targeting from advertisers, may be incorporated.

Information regarding the same user may arrive into MHTE 800 through additional interactions by the user. For example, the user may have also added "vegetarian recipes" to onePlace which can be combined with the targeting information derived from the user's interactions with the "Pizza Restaurant" entity to develop a targeting profile that the user would likely prefer content, advertisements, or promotions related to "vegetarian pizzas" as opposed to "nonvegetarian pizzas."

An illustration of the benefits afforded by MHTE 800 might be as follows: a pizza maker seeks new customers in a particular area. The pizza maker supplies ad copy or specialized content to Ad Copy Manager 804, along with target data supplied to Ad Display Manager 816.

The target data seeks males aged 18-34 who tend to eat out. Matching Manager 812 identifies a set of potential targets, including the user described above.

Matching Manager 812 is alerted, reviews the placement of entities on the user's home page and considers the level and type of user activity associated with the entities in the determination of targeted advertisements and content for the user. In this example, Matching Manager 812 configures an advertisement for a meatless pizza special, served by the pizza maker at its nearby establishment. This advertisement is delivered to the user by Mobile Homepage Manager 808.

In a related example, the user enters a search request for "restaurant" received by Mobile Home Page Manager 808. Matching Manager 812 reviews the user's metadata and search history and identifies the user as a potential target.

In addition to the existence of the "Vegetarian Recipes" entity in the user's Yahoo! onePlace in the user's Yahoo! Mobile Home Page, additional data and metadata may further enhance the user targeting profile, such as the potential target's prior search history including several searches using the term "vegetarian" in Yahoo! oneSearch, and additionally, the target having posted status updates to MySpace from Yahoo! oneConnect regarding vegetarian recipes.

Matching Manager 812 is alerted, reviews the user's metadata including social relations and associations history, and configures an advertisement for the meatless pizza special, served by the pizza maker at its nearby establishment. This advertisement is delivered to the user by Mobile Homepage Manager 808 along with search results.

FIG. 14 illustrates two manners in which a user's placement of entities on the user's home page may be used by Matching Manager 812 as part of the advertisement personalization process. Panel 1410 illustrates a user setting panel to coordinate the user's various electronic mail accounts, instant messengers, social networks, contacts, and calendar. When listing information of these kinds, it is customary for the user to place the user's favorite entries near the top of each list. Thus, in panel 1410, it appears the user is more actively uses the user's Facebook account than the user's MySpace account, as evidenced by the relative ranking of the two entries.

As explained above, Matching Manager 812 may use these types of metrics, such as, ranking within group or between groups, as part of the advertisement personalization process increasing the weight of a particular user to an entity or brand based upon a higher order on their mobile home page or strong associations through past, current or predicted activities.

Similarly, panel 1420 corresponds to the user selected ordering of entities, such as those illustrated in FIGS. 9-13. For example, the entity ordering shown in panel 1420 corresponds to all entities shown in FIG. 12; note the final entity of "Boston Red Sox." In panel 1420, the user is able to reorder the user's entries as described above. Matching Manager 812 may use this ordering, for example, to select a particular advertisement from a pool of eligible advertisements, with the selected advertisement displayed to the user whereby content and entities associated with a mobile home page influence the selection of the advertisement by increasing the rank of potential advertisements related to content or entities to which the user is subscribed. In addition, a user's deselection of content or advertisers in the past may also be used to influence the ranking.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile telephones, browsing or gaming devices, networking devices or any other device that incorporates hard-wired and/or program logic to implement the techniques.

Figure 16:
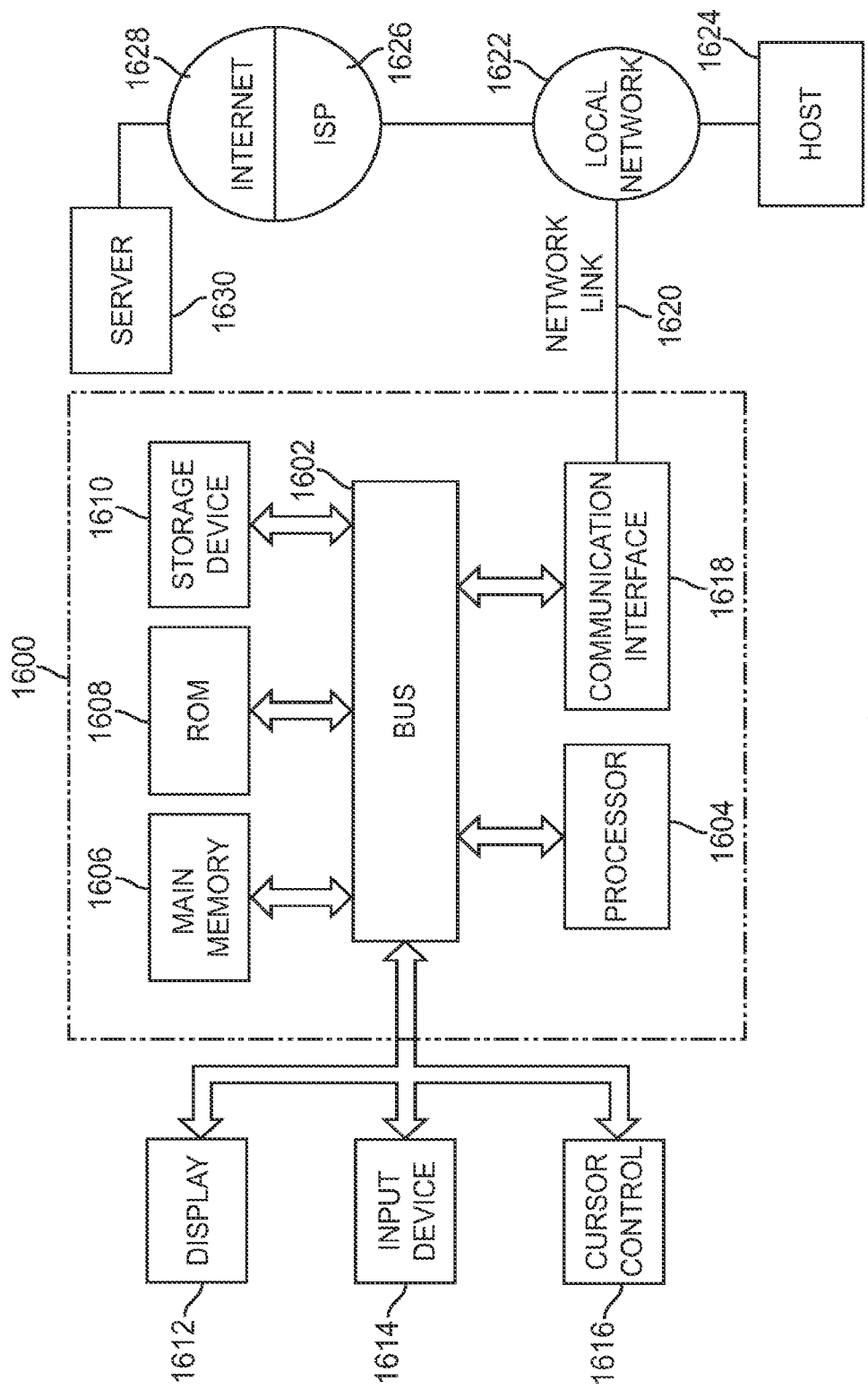
FIG. 16 is a block diagram of a computer system on which embodiments of the invention may be implemented.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. Input device 1614 may also be a mobile telephone, gaming, reading, browsing or communication device that may include speech and recording (audio), visual (video and image), tactile and gestural input or sensing input capabilities as well as audio, visual and tactile output capabilities and multi-channel communication capabilities that is interactively connected through one or more networks such as to report its state and location in real-time over time and facilitate access to content and users.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610.

Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604 as well as on mobile device 1614 where it may utilize wireless data transmission, wireless client-server communications, and wireless peer-to-peer communications to deliver mobile applications.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

Embodiments of the invention may also be directed to computer program products comprising software stored on any computer readable medium including mobile telephones or computing devices. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving user input that indicates that a user desires for a page to have a region that includes information about a particular entity;
   selecting, based on the particular entity, a plurality of sources to suggest to the user;
   wherein at least one of the plurality of sources is a non-feed enabled web page;
   presenting to the user an interface with controls that allow the user to select one or more of the plurality of sources;
   receiving user input, through the interface, that indicates that the user has selected one or more selected sources, wherein the one or more selected sources includes a non-feed enabled web page;
   a registration manager creating a recurring information feed out of the non-feed enabled web page by periodically fetching data from the non-feed enabled web page;
   in response to a request by the user to view the page, performing the steps of:
      generating a dynamically assembled set of information about the particular entity from the one or more selected sources, including the non-feed enabled webpage associated with the particular entity, wherein generating the dynamically assembled set of information about the particular entity includes:
         obtaining data items about the particular entity from the recurring information feed; and
         adding the data items to the dynamically assembled set of information;
      creating a dynamically constructed version of the page in which the dynamically assembled set of information is displayed in the region;
      causing display of the dynamically constructed version of the page; and
   wherein the method is performed by one or more computing devices.

2. The method of claim 1, wherein the particular entity is one of a person, place, thing, organization, association, location, business, event, object, vehicle, device, appliance, tag, label, date, time, or time period.

3. One or more non-transitory storage media storing instructions which, when executed by one or more computing devices, cause performance of the method recited in claim 2.

4. The method of claim 1, further comprising:
   adding, to the dynamically assembled set of information, data items from one or more information sources other than the non-feed enabled web page;
   tracking metadata from one or more search histories of the user; and
   determining at least one of the one or more information sources based, at least in part, on the metadata.

5. One or more non-transitory storage media storing instructions which, when executed by one or more computing devices, cause performance of the method recited in claim 4.

6. The method of claim 1, further comprising:
   adding, to the dynamically assembled set of information, data items from one or more information sources other than the non-feed enabled web page; and
   accessing at least one of the one or more information sources using a web link.

7. One or more non-transitory storage media storing instructions which, when executed by one or more computing devices, cause performance of the method recited in claim 6.

8. One or more non-transitory storage media storing instructions which, when executed by one or more computing devices, cause performance of the method recited in claim 1.

9. The method of claim 1 wherein:
   the data items obtained from the recurring information feed are a first set of data items;
   the method further comprises the steps of:
      obtaining a second set of data items from a feed-enabled source; and
      adding the second set of data items to the dynamically assembled set of information.

10. The method of claim 1 wherein:
the data items obtained from the recurring information feed are a first set of data items;
the method further comprises the steps of:
obtaining a second set of data items from a second non-feed enabled web page; and
adding the second set of data items to the dynamically assembled set of information.

11. The method of claim 1 wherein:
the non-feed enabled web page is one of a plurality of sources from which data items are obtained for the dynamically assembled set of information; and
the method further comprises receiving source selection input, from the user, that specifies one or more of the plurality of sources from which data items are to be obtained for the dynamically assembled set of information.

12. The method of claim 1 further comprising:
receiving source selection input, from the user, that indicates that the user desires for the region to include information from the non-feed enabled web page; and
causing the registration manager to create the recurring information feed in response to the source selection input.

13. A server comprising:
one or more processors;
memory operatively coupled to the one or more processors;
sequences of instructions stored in the memory;
wherein the sequences of instructions include instructions for:
receiving user input that indicates that a user desires for a page to have a region that includes information about a particular entity;
selecting, based on the particular entity, a plurality of sources to suggest to the user;
wherein at least one of the plurality of sources is a non-feed enabled web page;
presenting to the user an interface with controls that allow the user to select one or more of the plurality of sources;
receiving user input, through the interface, that indicates that the user has selected one or more selected sources, wherein the one or more selected sources includes a non-feed enabled web page;
a registration manager creating a recurring information feed out of a non-feed enabled web page by periodically fetching data from the non-feed enabled web page;
in response to a request by the user to view the page, performing the steps of:
generating a dynamically assembled set of information about the particular entity from the one or more selected sources, including the non-feed enabled webpage associated with the particular entity, wherein generating the dynamically assembled set of information about the particular entity includes:
obtaining data items about the particular entity from the recurring information feed; and
adding the data items to the dynamically assembled set of information;
creating a dynamically constructed version of the page in which the dynamically assembled set of information is displayed in the region;
causing display of the dynamically constructed version of the web page.

14. The server of claim 13, wherein the particular entity is one of a person, place, thing, organization, association, location, business, event, object, vehicle, device, appliance, tag, label, date, time, or time period.

15. The server of claim 13, wherein the sequences of instructions include instructions for:
adding, to the dynamically assembled set of information, data items from one or more information sources other than the non-feed enabled web page;
tracking metadata from one or more search histories of the user; and
determining at least one of the one or more information sources based, at least in part, on the metadata.

16. The server of claim 13, wherein the sequences of instructions include instructions for:
adding, to the dynamically assembled set of information, data items from one or more information sources other than the non-feed enabled web page; and
accessing at least one of the one or more information sources using a web link.

* * * * *